UNIDIRECTIONAL ELECTRICAL FIELD

UNIDIRECTIONAL MAGNETIC FIELD

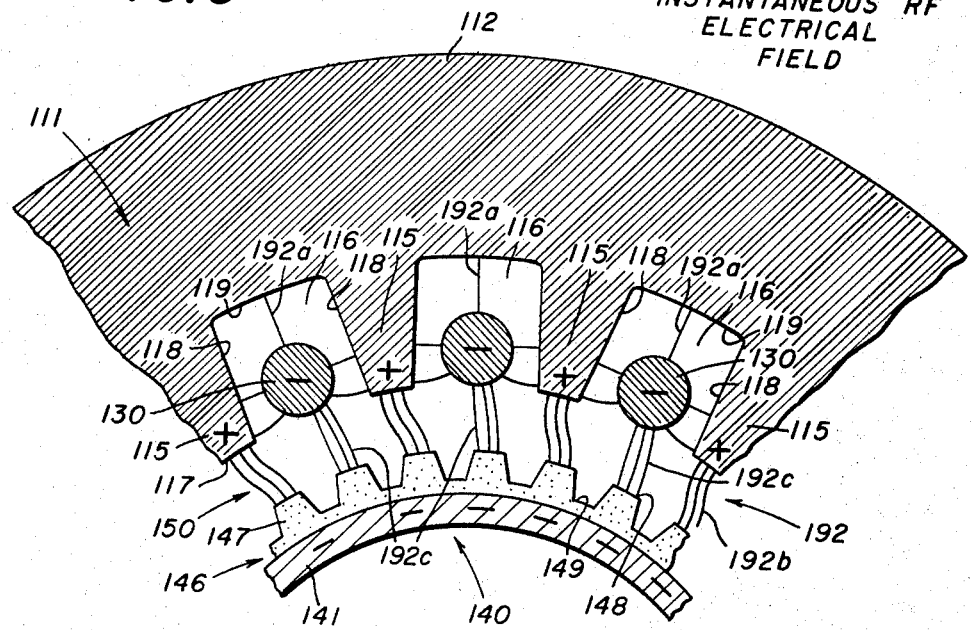
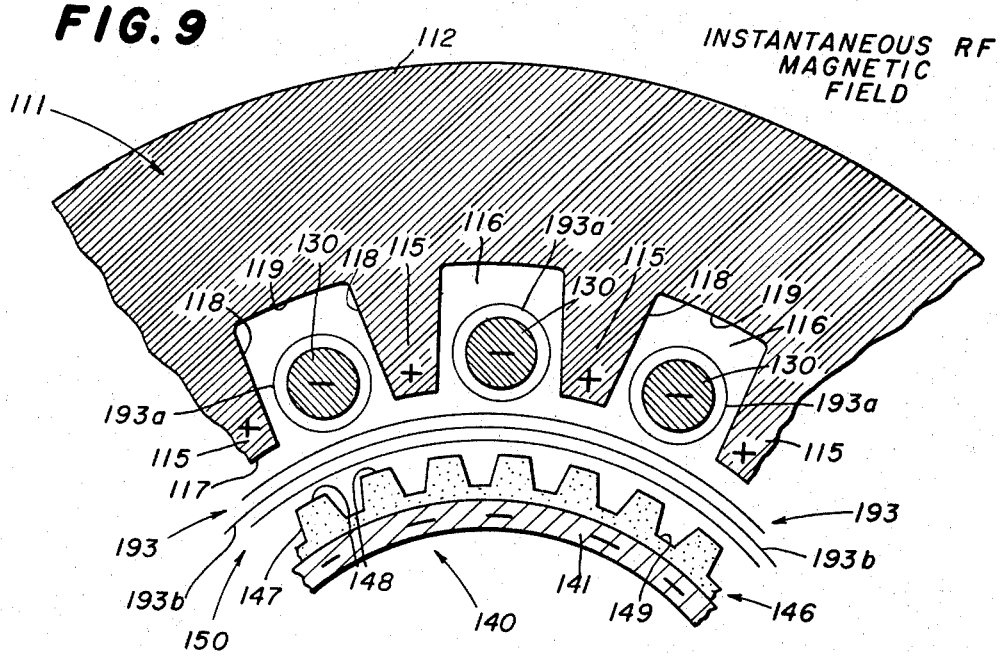

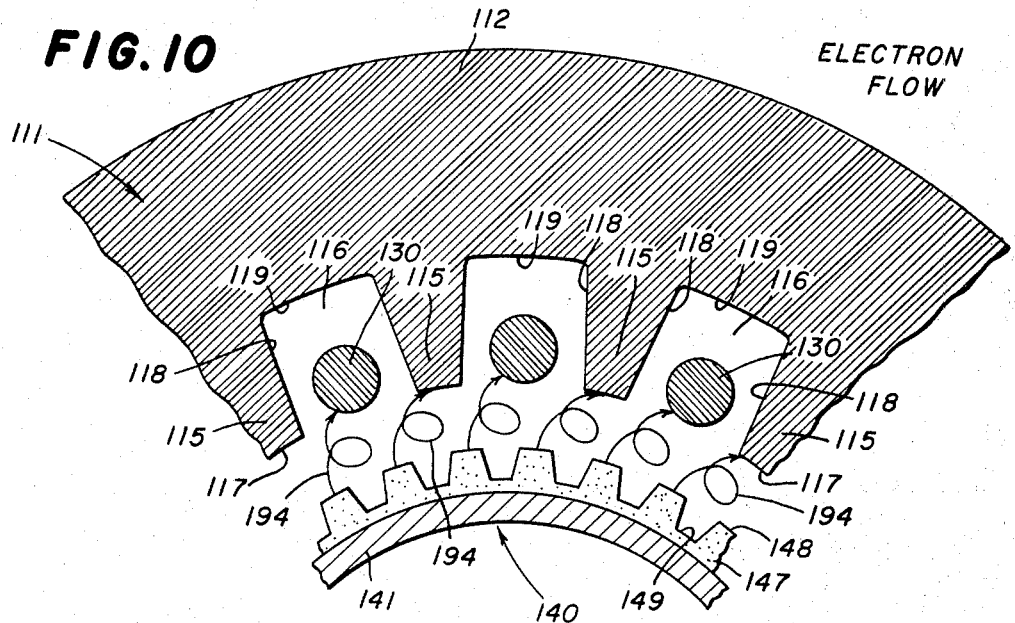

FIG. 14

United States Patent Office 3,413,516
Patented Nov. 26, 1968

3,413,516
CROSSED-FIELD DISCHARGE DEVICES AND OSCILLATORS AND AMPLIFIERS INCORPORATING THE SAME
James E. Staats, Louisville, Ky., assignor to General Electric Company, a corporation of New York
Filed Aug. 30, 1965, Ser. No. 483,488
20 Claims. (Cl. 315—39.77)

ABSTRACT OF THE DISCLOSURE

There is disclosed a crossed-field discharge device including a hollow anode structure and a cathode structure disposed therein and cooperating therewith to define an axially extending interaction space, the anode structure having axially extending anode recesses therein in which are mounted rods supported by and electrically connected to the cathode structure, and a pair of end structures joining respectively the opposite ends of the anode structure and the cathode structure for mechanically supporting the same while providing electrical insulation therebetween; there also is disclosed a form of the device utilizing a tapered electron emissive surface; finally there are disclosed oscillators and amplifiers incorporating the crossed-field discharge devices therein.

---

The present invention relates to improved crossed-field discharge devices and microwave circuits incorporating the same including microwave oscillator circuits and microwave amplifier circuits.

It is a general object of the invention to provide new and improved crossed-field discharge devices for use at microwave frequencies, which devices are of exceedingly simple and economical construction and arrangement, and which devices are particularly adapted for operation upon the application of relatively low voltage operating potentials thereto.

Another object of the invention is to provide improved crossed-field discharge devices of the type set forth which can provide a high output of microwave energy in proportion to the physical dimensions thereof, whereby to permit the miniaturization of microwave circuits employing the improved crossed-field discharge devices.

Another object of the invention is to provide improved crossed-field discharge devices of the type set forth inclining an anode structure defining an axially extending space and having an axially extending cathode structure disposed therein and cooperating therewith to define an axially extending annular interaction space, means for establishing an axially extending RF wave in the axially extending space and having associated therewith RF electrical fields and RF magnetic fields disposed normal to the axis of the device and extending into the interaction space, and output connections respectively coupled to the anode structure and the cathode structure for removing energy from the axially extending space using the cathode structure as a probe interacting with the RF fields.

Another object of the invention is to provide an improved crossed-field discharge device of the type set forth, wherein a first end structure joins the corresponding adjacent ends of the anode structure and the cathode structure for mechanically supporting the cathode structure with respect to the anode structure while providing electrical insulation therebetween, and a second end structure joins corresponding second ends of the anode structure and the cathode structure for mechanically supporting the cathode structure with support to the anode structure while providing electrical insulation therebetween, the end structures being the only electrically insulating seals for the crossed-field discharge device.

Another object of the invention is to provide an improved crossed-field discharge device of the type set forth wherein the cathode structure includes an emissive cathode having a heater operatively associated therewith, a first connector commonly electrically connected both to the cathode and to one terminal of the heater, a second connector electrically connected to the other terminal of the heater, a first end structure joining one end of the anode structure and the first connector for mechanically supporting the cathode and the heater with respect to the anode structure while providing electrical insulation therebetween and a second end structure joining the other end of the anode structure and the second connector for mechanically supporting the cathode and the heater with respect to the anode structure while providing electrical insulation therebetween, the end structures being the only insulating seals for the crossed-field discharge device.

Another object of the invention is to provide an improved crossed-field discharge device of the type set forth, and further including rods disposed in axially extending recesses in the inner surface of the anode structure, the rods being connected to the cathode structure internally of the crossed-field discharge device.

In connection with the foregoing object, another object of the invention is to provide an improved crossed-field discharge device of the type set forth, wherein the cathode structure has a conically shaped electron emissive element disposed within the anode structure and adjacent to the inner portion of the interaction space with the axis of the emissive element extending axially of the device, the preferred shape of the emissive element being a section of the regular right cone.

Yet another object of the invention is to provide an improved microwave oscillator incorporating therein a crossed-field discharge device of the present invention, the resonant circuit for the oscillator being connected between the anode structure and the cathode structure of the device.

In connection with the foregoing object, it is another object of the invention to provide an improved microwave oscillator of the type set forth wherein the resonant circuit is of the coaxial conductor type and has a wavelength corresponding to ½ of the wavelength of the resonant frequency thereof.

A further object of the invention is to provide an improved microwave amplifier incorporating therein a crossed-field discharge device of the present invention.

Further features of the invention pertain to the particular arrangement of the parts whereby the above-outlined and additional operating features thereof are attained.

The invention, both as to its organization and method of operation, together with further objects and advantages thereof, will best be understood by reference to the following specification taken in connection with the accompanying drawings, in which.

Figure 3:
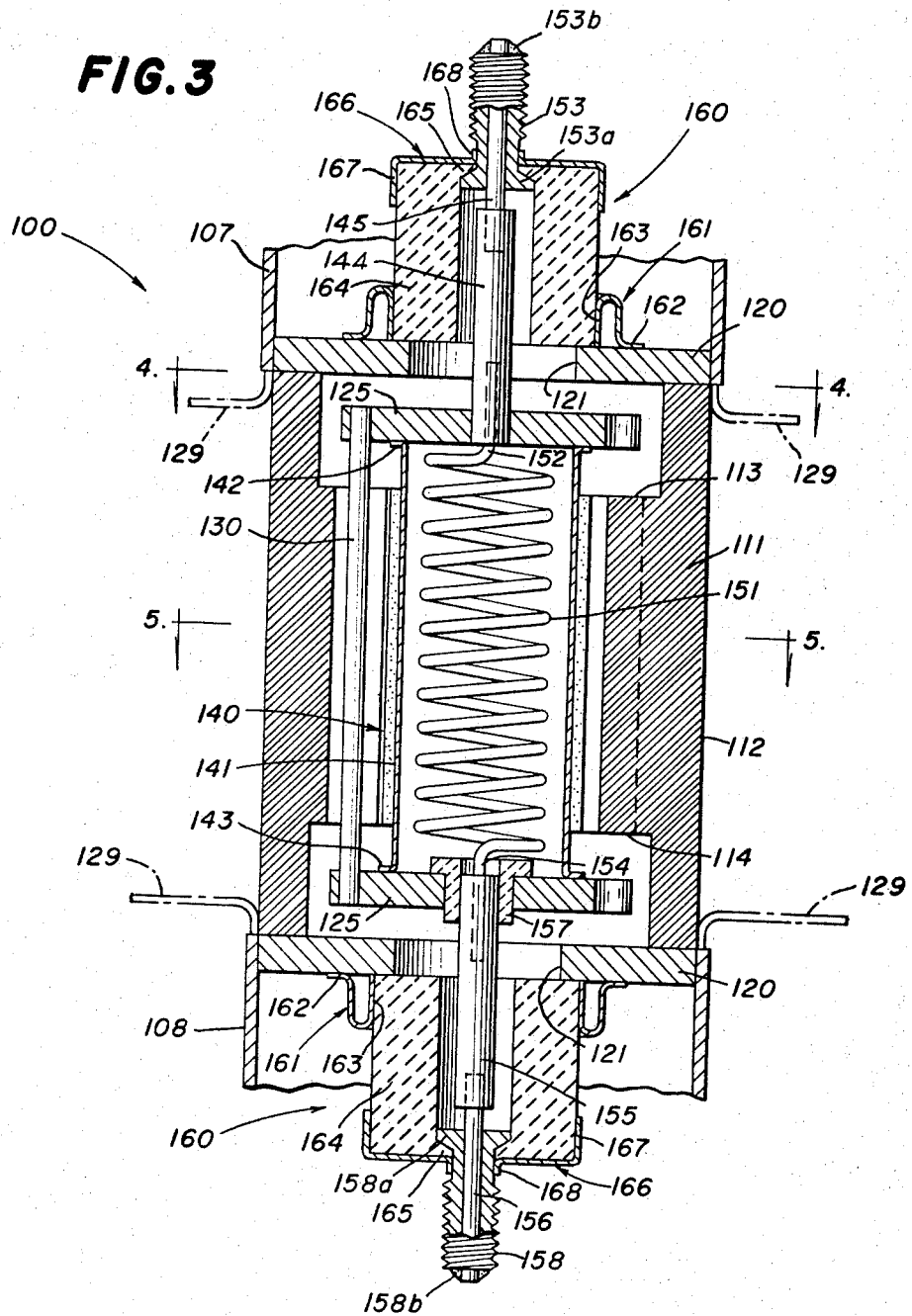
FIG. 3 is an enlarged view in vertical section through a first preferred form of the crossed-field discharge device of FIG. 2.
Figure 4:
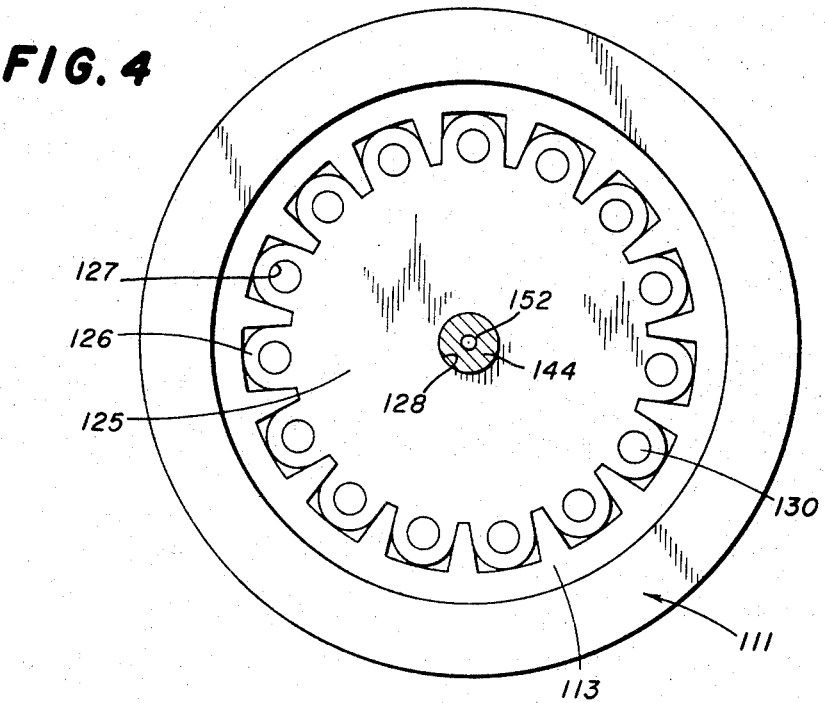
FIG. 4 is a further enlarged view in horizontal section through the device of FIG. 3 along the line 4—4 thereof.
Figure 5:
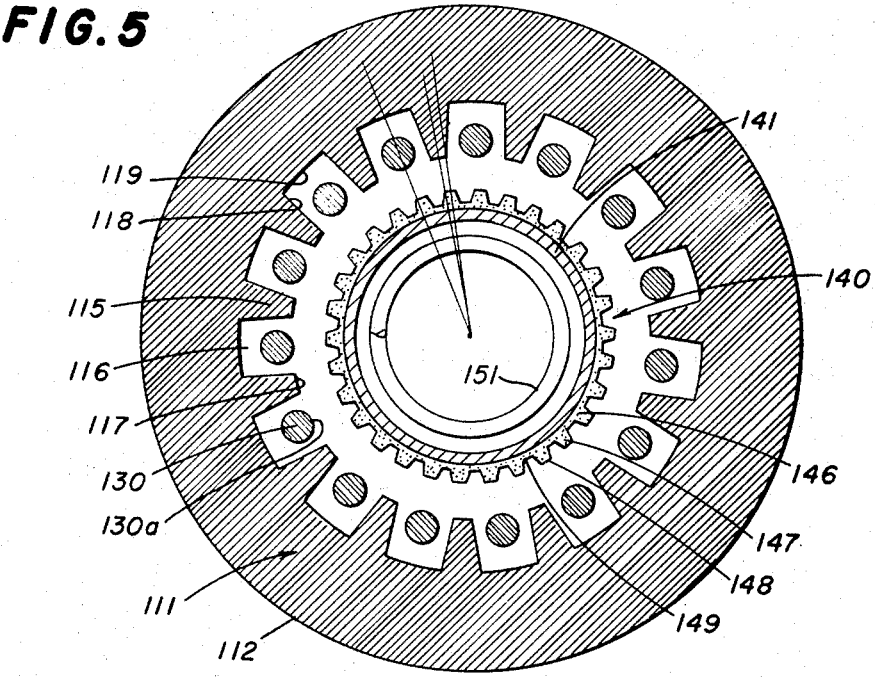
FIG. 5 is a further enlarged view in horizontal section through the device of FIG. 3 along the line 5—5 thereof.
Figure 6:
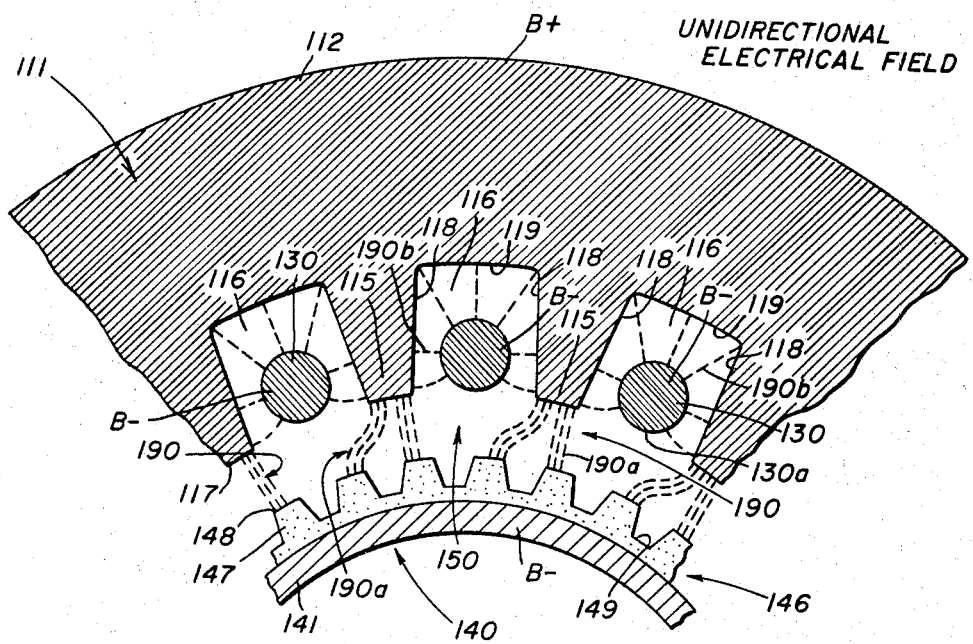
Figure 12:
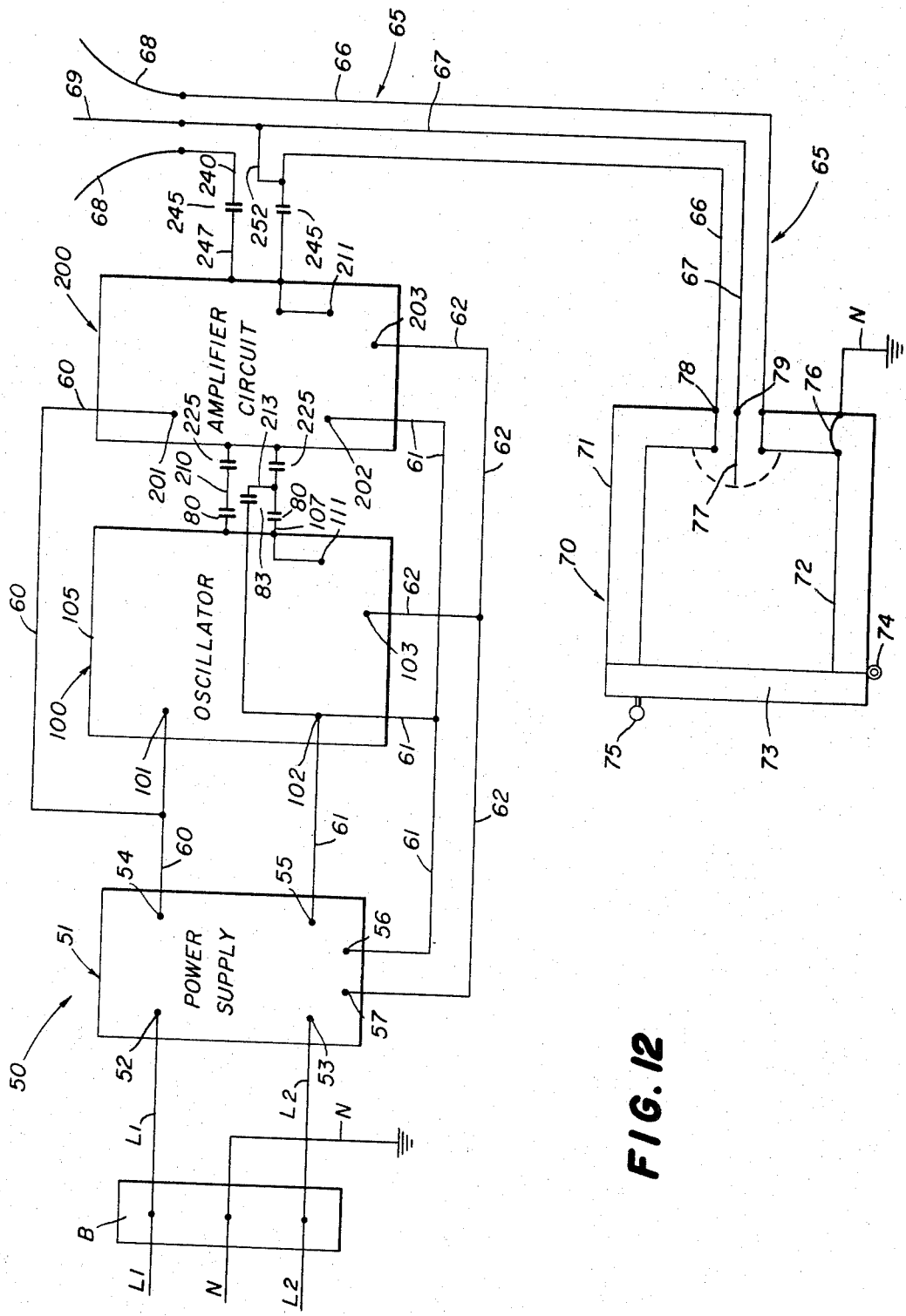
Figure 13:
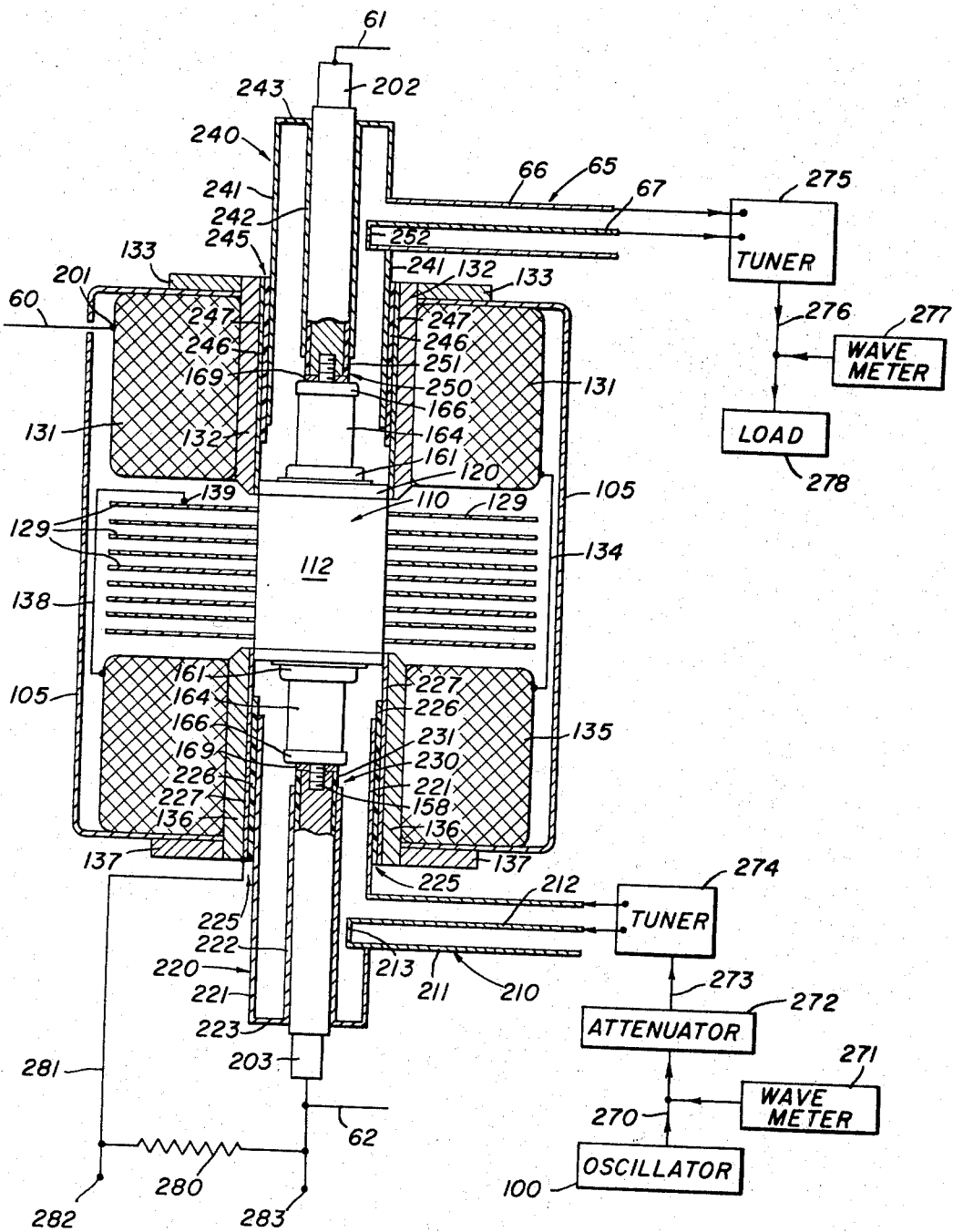

FIGS. 6 to 11, inclusive, are still further enlarged fragmentary views in horizontal section of a portion of FIG. 5 and illustrating the various electrical and magnetic fields present in the device of FIGS. 3 to 5 during the operation thereof;

FIG. 12 is a schematic and diagrammatic illustration of an amplifier circuit for amplifying the output of the microwave oscillator, the amplifier circuit utilizing therein a crossed-field discharge device made in accordance with and embodying the principles of the present invention;

FIG. 13 is a view in vertical section through the amplifier circuit of FIG. 12 and illustrating the connections for the crossed-field discharge device therein including the magnet field coils, the oscillator input circuits and the output circuits; and FIG. 14 is an enlarged view in vertical section through a modified form of the crossed-field discharge device illustrated in FIGS. 3 to 5.

Figure 1:
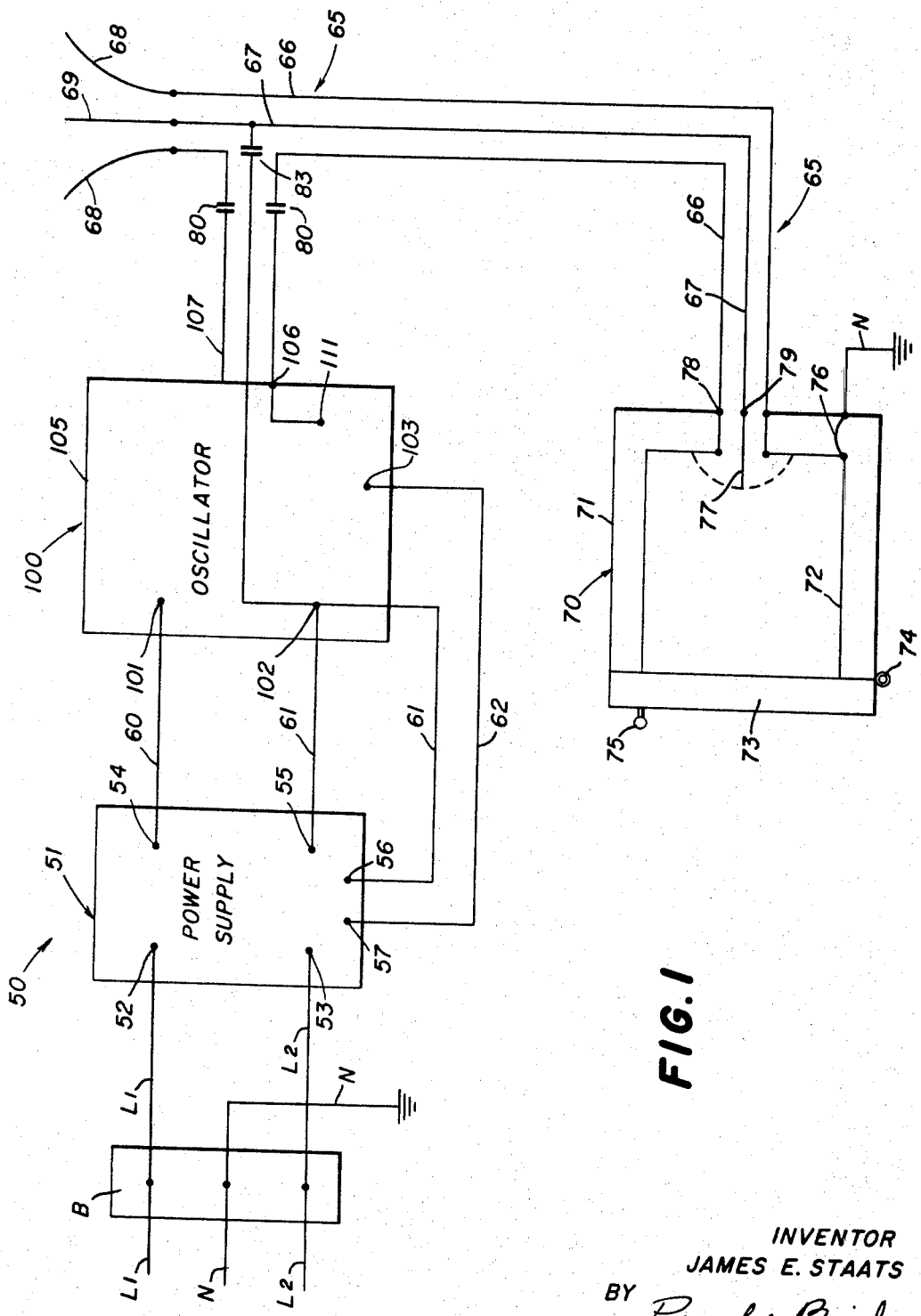
FIGURE 1 is a schematic and diagrammatic illustration of an oscillator circuit incorporating therein a crossed-field discharge device of the present invention.

Referring now to FIG. 1 of the drawings, there is diagrammatically illustrated an oscillator circuit 50 embodying the features of the present invention, the oscillator circuit 50 having been illustrated as connected to a 3-wire Edison network of 236 volts, single-phase, 60-cycle AC, and including two ungrounded line conductors L1 and L2 and a grounded neutral conductor N, the three conductors mentioned being terminated at an associated electrical insulating block B. The circuit 50 also comprises a power supply 51 having a pair of input terminals 52 and 53 that are respectively connected to the conductors L1 and L2. A first pair of output terminals 54 and 55 is provided for supplying a rectified and filtered DC voltage of low amplitude for supplying the DC operating potentials to the crossed-field idscharge device of the oscillator circuit 50; and a second pair of output terminals 56 and 57 is provided for supplying a relatively low voltage AC voltage for the purpose of energizing the heater of the crossed-field discharge device of the oscillator circuit 50. More specifically, the input terminals 52 and 53 are connected to the output termnials 54 and 55 by a converter, the converter preferably being of the type disclosed in the copending application of James E. Staats, Ser. No. 181,144, filed Mar. 20, 1962, wherein there is disclosed a converter comprising an assembly of capacitors and rectifiers connected between the input terminals and output terminals thereof, and characterized by the production of a DC output voltage across the output terminals thereof in response to the application of a low frequency AC input voltage across the input terminals thereof, wherein the amplitude of the DC output voltage from the converter is approximately twice the peak value of the AC input voltage to the converter. The converter described is in fact a voltage doubler and rectifier circuit wherein the output DC potential therefrom at the terminals 54 and 55 is approximately 666 volts when the AC supply source has an R.M.S. voltage of 236 volts between the conductors L1 and L2, the 666 volts DC being the open circuit or no load value for the DC output from the power supply 51.

The oscillator circuit 50 further comprises an oscillator 100 incorporating therein a crossed-field discharge device made in accordance with and embodying the principles of the present invention, the oscillator 100 having a pair of input terminals 101 and 102 that are connected respectively to the DC output terminals 54 and 55 of the power supply 51 by means of conductors 60 and 61, respectively; the input terminal 102 is also connected by the conductor 61 to one of the low voltage AC output terminals 56 of the power supply 51. A third input terminal 103 is provided for the oscillator 100, the input terminal 103 being connected by a conductor 62 to the other low voltage AC output terminal 57 of the power supply 51. As illustrated, all of the parts of the oscillator 100 are surrounded by a metallic casing 105 to which is connected as at 106 an outer tubular conductor 107 within which is disposed an inner conductor from the input terminal 102 that forms one of the output connections for the oscillator 100. Another output connection 111 is provided for the oscillator 100, the output connection 111 being connected to the metallic casing 105 by the connection 106 and thus to the outer conductor 107. Connection is made to an output transmission line 65 including an outer tubular conductor 66 and an inner conductor 67 disposed therein, a first capacitive coupling being provided by the coupler 80 between the outer conductor 107 and the outer conductor 66, and a second capacitive coupling being provided by the coupler 83 between the terminal 102 and the inner conductor 67. The capacitive coupling provided by the couplers 80 and 83 is desirable and necessary, since for safety purposes it is necessary to ground the outer conductor 66 of the transmission line 65, which grounding of the outer conductor 66 is not possible if there is a DC connection to the oscillator casing 105, the casing 105 having a potential with respect to ground because of the application of operating potentials from the voltage doubler and rectifier circuit in the power supply 51, it being inherent in the construction and operation of the circuit of the power supply 51 that neither the conductor 60 nor the conductor 61 can be grounded. Accordingly, it is also necessary and desirable that the power supply 51 and the oscillator 100 be electrically shielded by a grounded outer housing (not shown) disposed therearound, all as is fully described in the aforementioned copending application Ser. No. 181,144.

The microwave energy supplied from the oscillator 100 to the transmission line 65 may be used for any desired purposes, two typical uses of the microwave energy being illustrated in FIG. 1, the first use being illustrated in the upper righthand portion of FIG. 1 and the second use being illustrated in the lower portion of FIG. 1. Referring to the upper righthand portion of FIG. 1, in the first use of the microwave energy illustrated therein the transmission line 65 is coupled to an antenna of the type commonly used in search radar, the outer conductor 66 being connected to the outer radiating or antenna elements 68 and the inner conductor 67 being connected to an inner radiating or antenna element 69, the antenna elements 68 and 69 serving to match the impedance of the transmission line 65 to the impedance of the atmosphere. In the second use of the microwave energy illustrated in FIG. 1, the transmission line 65 is shown coupled to an electronic heating apparatus, such as the electronic range 70 illustrated that is especially designed for home use. More particularly, the range 70 comprises an upstanding substantially box-like casing 71 formed of steel and housing thereing a metal liner 72 defining a heating cavity therein. The metal liner 72 may also be formed of steel, and essentially comprises a box-like structure provided with a top wall, a bottom wall, a rear wall and a pair of opposed side walls; whereby the liner 72 is provided with an upstanding front opening into the heating cavity defined therein, the casing 71 being provided with the front door 73 arranged in the front opening thus formed and cooperating with a liner 72. More particularly, the front door 73 is mounted adjacent to the lower end thereof upon associated hinge structure 74, and is provided adjacent to the upper end thereof with a handle 75, whereby the front door 73 is movable between a substantially vertical closed position and a substantially horizontal open position with respect to the front opening provided in the liner 72. Also the front door 73 has an inner metal sheet that is formed of steel and cooperates with the liner 72 entirely to close the heating cavity when the front door 73 occupies its closed position. For safety purposes, the inner liner 72 is connected by a conductor 76 to the outer casing 71 which is in turn grounded by the conductor N. The outer conductor 66 of the transmission line 65 is connected as at 78 to the casing 71 and the liner 72 of the range 70, and there is provided within the range 70 at the rear thereof a radiating element or antenna 77 that is connected as at 79 to the inner conductor 67 of the transmission line 65. Accordingly, the microwave energy within the transmission line 65 is radiated into the cooking cavity of the range 70 to provide the power for cooking materials disposed therein. It further will be understood that in a preferred embodiment of the range 70, the power supply 51 and the oscillator 100 together with the transmission line 65 are all preferably disposed within a common housing that also includes the casing 71, the common housing being preferably formed of steel and grounded for safety purposes.

Further details of the construction of the oscillator 100 and the crossed-field discharge device 110 forming a part thereof will now be described with particular reference to FIGS. 2 to 5 of the drawings. The device 110 includes an anode 111, a pair of opposed pole pieces 120, a plurality of rods 130, a cathode structure 140 and a pair of opposed end structures 160. The anode 111 is generally annular in shape and has a circular cross section, the outer wall 112 thereof being cylindrical, there being provided interiorly of the anode 111 an axially extending space. In addition, a recess is provided in each end of the anode 111 terminating in opposed inner end walls 113 and 114 that are spaced inwardly equal distances from the adjacent ends of the anode 111. Provided on the inner surface of the anode 111 and extending between the opposed inner end walls 113 and 114 is a plurality of axially extending anode segments 115 that project radially inwardly into the axially extending space within the anode 111 and providing therebetween a corresponding plurality of axially extending anode recesses 116, fifteen of the anode segments 115 and fifteen of the corresponding recesses 116 being provided in the anode 111 as illustrated. Each of the anode segments 115 has an axially extending inner surface 117 and a pair of outwardly directed side walls 118 on the opposite sides thereof, the circumferential extent of the inner surface 117 being substantially less than the radial extent of the associated side walls 118. The outer ends of adjacent side walls 118 are joined by an outer wall 119, whereby the recesses 116 are defined by the associated side walls 118 and the associated outer wall 119, the side walls 118 of each recess 116 being disposed substantially parallel to each other. The anode 111 is formed of a metal having good electrical conductivity and good thermal conductivity, the preferred material of construction being copper.

Figure 2:
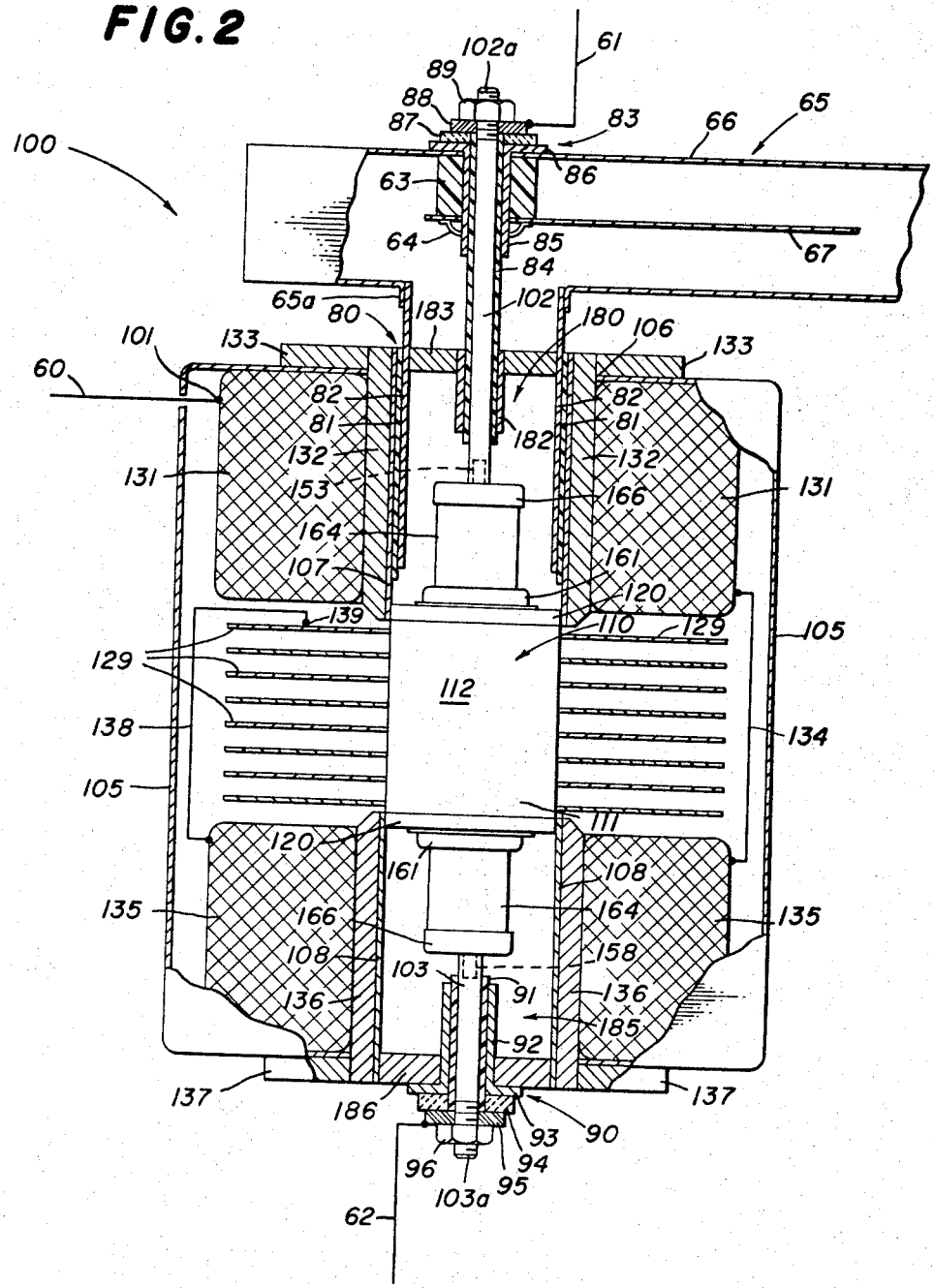
FIG. 2 is a vertical section through the oscillator of FIG. 1 and illustrating the circuit connections for the crossed-field discharge device therein including the magnetic field coils and the external tuned circuits used therewith.

In order to remove heat from the anode 111 during the operation of the device 110, there is mounted upon the outer wall 112 of the anode 111 a stacked array of cooling fins 129, eight of the fins 129 being illustrated in FIG. 2 extending outwardly and radially with respect to the anode 111. The fins 129 are preferably formed of a good heat conducting material such as copper and are in both mechanical and heat transfer connection with the anode 111, the fins 129 preferably being brazed upon the outer wall 112 of the anode 111. The shape of the fins 129 is substantially rectangular so that they fit within the casing 105, there preferably being provided means for passing a cooling fluid, such as a stream of air, through the casing 105 and over the fins 129 to effect cooling thereof and a consequent removal of heat from the anode 111 and the other parts of the device 110 during the operation thereof.

Mounted on the outer ends of the anode 111 and mechanically and electrically connected thereto are the pole pieces 120, respectively, the pile pieces 120 being identical in construction, whereby the same reference numerals have been applied to like parts of both of the pole pieces 120. The pole pieces 120 are formed of a material having a high magnetic permeability, such as soft iron, and are copper plated to render the outer surfaces thereof highly conductive to RF energy. As illustrated, each of the pole pieces 120 is generally disk shaped having an outer diameter equal to the outer diameter of the anode 111 and extending inwardly to overlie the anode segments 115 and the recesses 116 and having disposed centrally thereof a circular opening 121.

Disposed a short distance axially inwardly with respect to each of the pole pieces 120 are two plates 125, the plates 125 each being more particularly disposed within the recess in the associated end of the anode 111 and being disposed between the adjacent pole piece 120 and the adjacent anode end wall 113 or 114, as the case may be. The plates 125 are identical in construction, whereby the same reference numerals have been applied to like parts of both of the plates 125. The plates 125 are formed of a material having a high magnetic permeability and are copper plated to render the same highly conductive. As illustrated, each of the plates 125 is generally cylindrical in shape (see FIG. 4 also) and includes a plurality of outwardly extending projections 126 upon the periphery thereof, there being fifteen of the projections 126 equiangularly disposed about the associated plate 125 and overlying an associated anode recess 116, whereby each of the projections 126 overlies and is in axial alignment with an associated recess 116 in the anode 111. Formed in each of the projections 126 is an opening 127 receiving therein the associated end of one of the rods 130, each rod 130 being firmly secured to the associated projections 126, whereby each of the rods 130 extends between and is connected to and supported by a pair of aligned projections 126 on the opposed plates 125. The rods 130 are preferably formed of a nichrome alloy and are copper plated to improve the RF conductivity of the exposed surfaces thereof. As illustrated, the rods 130 are cylindrical in shape and circular in cross section, the diameter of each of the rods 130 being approximately equal to ½ of the dimensions of an associated recess 116, each of the rods 130 being disposed midway between the side walls 118 of the associated recess 116 and being disposed with the inner surface 130a thereof positioned radially outwardly a slight distance from a surface on which would fall the inner surfaces 117 of the anode segments 115, the rods 130 being disposed radially outwardly a distance of approximately 0.005 inch in a typical construction, whereby each of the rods 130 is essentially disposed within the associated recess 116 and the outer ends thereof extend into and are fixedly secured to the associated projections 126 on the plates 125.

The pole pieces 120 arranged adjacent to the opposite ends of the anode 111 are utilized for establishing a unidirectional magnetic field extending axially through the space within the anode 111, and specifically through the interaction space 150 defined between the anode 111 and the cathode 140. To this end a pair of magnet coils 131 and 135 is provided, the magnet coil 131 being disposed about the upper end of the device 110 as viewed in FIG. 2 and the magnet coil 135 being disposed about the lower end of the device 110 as viewed in FIG. 2. The coils 131 and 135 are each shaped as a torous, are wound of electrically conductive wire, and as illustrated, are disposed respectively about magnetic yokes 132 and 136 that are in the form of cylinders each disposed within the opening in the associated coil. There further are provided outwardly extending flanges 133 and 137, respectively, on the yokes 132 and 136, the casing 105 being disposed within the flanges 133 and 137 and forming a mechanical connection and a good magnetic path therebetween. It will be understood that the pole pieces 120, the magnetic yokes 132 and 136, the flanges 133 and 137, and the casing 105 are all formed of metals having a high magnetic permeability, such as iron and steel, whereby when the magnet coils 131 and 135 are energized, a strong and uniform unidirectional magnetic field is established between the pole pieces 120 within the device 110 and extending axially through the interaction space 150 therein.

The circuit for energizing the coils 131 and 135 can be traced with reference to FIGS. 1 and 2 from the power supply 51, and specifically the DC output terminal 54 thereof, through the conductor 60 to the input terminal 101 of the oscillator 100 to which is connected one terminal of the magnet coil 131. The other terminal of the magnet coil 131 is connected by a conductor 134 to one terminal of the magnet coil 135, and the other terminal of the magnet coil 135 is connected by a conductor 138 to one of the cooling fins 129 by means of a connection 139, whereby the input terminal 101 is connected via the magnet coil 131, the conductor 134, the magnet coil 135 and the conductor 138 to the anode 111 of the device 110. The flow of current through the magnet coils 131 and 135 serves to produce the unidirectional magnetic field in the interaction space space 150 of the crossed-field discharge device 110.

The cathode structure 140 is provided in the axially extending space defined by the anode 111, the cathode structure 140 including a cylindrical wall 141 arranged with the axis thereof disposed at the axis of the anode 111, the wall 141 being formed of a heat resistant and electrically conductive material, the preferred material of construction being nickel. The upper end of the wall 141 is closed by the upper plate 125, the upper end of the wall 141 having an outwardly directed flange 142 integral therewith and suitably secured as by welding to the lower surface of the plate 125. The lower end of the wall 141 is closed by the lower plate 125, the lower end of the wall 141 having an outwardly directed flange 143 integral therewith and suitably secured as by welding to the upper surface of the plate 125. The upper plate 125 has an opening therein receiving therethrough a conductor 144 that is disposed along the axis of the anode 111 and extends outwardly beyond the plate 125 and outwardly beyond the associated pole piece 120, the conductor 144 being formed of a material having good electrical conductivity, such as copper, and being both mechanically and electrically secured to the associated plate 125.

The cathode wall 141 is provided with a sintered porous coating 146 impregnated with a suitable electron emissive oxide material, whereby upon heating of the cathode structure 140, the coating 146 readily emits electrons from the outer surface thereof. Referring particularly to FIG. 5, it will be seen that the coating 146 is shaped to provide a plurality of outwardly extending projections 147 each having outwardly converging side walls joining a generally circumferentially arranged outer surface 148, a space 149 being provided between adjacent projections 147. As illustrated, the circumferential extent of the outer surfaces 148 is substantially equal to the spacing 149 between adjacent projections 147. The preferred range of the circumferential extent of each of the outer surfaces 148 is approximately 25% to 60% of the circumferential distance between the centers of adjacent outer surfaces 148. The radial dimension of each of the projections 147 is also preferably greater than about 20% of the spacing between the anode 111 and the coating 146 on the cathode structure 140. The number of the projections 147 provided on the coating 146 is equal to the sum of the number of the anode segments 115 and the number of the rods 130, whereby there are thirty of the projections 147 provided upon the coating 146. The outer surfaces of the coating 146 together with the inner surfaces of the anode 11 define an interaction space 150 disposed therebetween in which the emitted electrons from the coating 146 interact with the electrical fields and the magnetic fields disposed between the anode 111 and the cathode structure 140. As will be described more fully hereinafter, the projections 147 combine with the anode segments 115 and the rods 130 to provide a preferred distribution of the several fields within the interaction space 150 of the device 110 that results in more desirable operating characteristics thereof. One particularly desirable result of the shape of the coating 146 as described is the minimizing of back heating of the cathode structure 140, the desirable emitted electrons emanating from the projections 147, and the undesirable emitted electrons emanating from the space 149 between the projections 147, thereby to facilitate the emission of desirable electrons and to suppress the emission of undesirable electrons.

It further will be noted from FIG. 5 that the center line of each projection 147 is circumferentially displaced relative to the center line of its corresponding anode segment 115 or rod 130, as the case may be; more specifically, the center lines of the projections 147 are displaced in a clockwise direction a circumferential distance equal to approximately 40% of the circumferential spacing between the center lines of an adjacent anode segment 115 and an adjacent rod 130. The circumferential displacement of the projections 147 with respect to the corresponding anode segment 115 or rod 130 is preferably in the range between 0% and approximately 45% of the circumferential spacing between adjacent anode segments and rods, a preferred range being between approximately 25% and 45% of the spacing between adjacent anode segments and rods, a still more preferred range being between approximately 35% and 45% of the spacing between adjacent anode segments and rods. Furthermore, the displacement is on the downstream side, i.e., in the direction of normal initial electron flow from the projections 147. Finally it will be noted that the electron emissive coating 146 is confined between the end walls 113 and 114 of the anode 111, the cathode structure 140 being carefully centered with respect to the anode structure 111 and the rods 130, whereby each of the cathode projections 147 extends axially of the device 110 parallel to the axis thereof and confined between the end walls 113 and 114.

As illustrated, the cathode structure 140 is of the indirectly heated type, and accordingly, there has been provided within the cathode wall 141 a heater 151 in the form of a coiled filament extending substantially the entire length of the cathode wall 141 and spaced inwardly a short distance from the inner surface thereof. The upper end of the heater 151 as viewed in FIG. 3 has an outer end 152 that extends outwardly into an opening in the lower end of the conductor 144 and is mechanically and electrically connected thereto, whereby the cathode structure 140 and the heater 151 and the rods 130 are all mechanically and electrically connected to the conductor 144. The lower end of the heater 151 has an outer end 154 that extends into an opening in the upper end of the conductor 155 and is mechanically and electrically secured thereto. The conductor 155 is preferably formed of copper and extends downwardly through and spaced from the lower plate 125 and downwardly through the opening 121 in the lower pole pieces 120 and beyond the lower surface thereof. An insulating bushing 157, formed preferably of ceramic, surrounds the upper end of the conductor 155 and is disposed between the conductive plate 125 and the conductor 155 to provide electrical insulation therebetween.

The uppermost end of the conductor 144 has an opening therein receiving the lower end of a conductor 145 of lesser diameter, the conductors 144 and 145 being mechanically and electrically secured one to the other, the upper end of the conductor 145 extending through an opening in a connector 153 and being secured thereto as by brazing at 153b. The lowermost end of the conductor 155 has an opening therein receiving the upper end of a conductor 156 of smaller diameter therein that is mechanically and electrically secured thereto, the conductor 156 also extending through an opening in an associated connector 158 and being secured thereto such as by brazing at 158b. Accordingly, the connector 153 is in mechanical and electrical connection with the rods 130, the cathode 140 and one terminal of the heater 151, and the connector 158 is in electrical connection only with the lower terminal of the heater 151, but also is mechanically connected to but electrically insulated from the lower end of the rods 130 and the cathode 140 by means of the insulating bushing 157.

A pair of identical end structures 160 is provided at the opposite ends of the device 110, the end structures 160 serving to provide a hermetic seal between the pole piece 120 and the connector 153 at the upper end of the device 110 as viewed in FIG. 3, and a hermetic seal between the connector 158 and the pole piece 120 at the lower end of the device 110, the pole pieces 120 in effect being mechanical and electrical extensions of the anode 111. Since the end structures 160 are identical in construction, only one will be described in detail, like reference numerals being applied to like parts of both of the end structure 160. A first seal member 161 is provided formed of a good electrically conductive material that is nonmagnetic, the preferred material being "Fernico" alloy, a typical composition being 54% iron, 28% nickel and 18% cobalt, the material also being of the type that can be readily secured both to a metal surface and to a ceramic surface. The seal member 161 is generally cylindrical in shape and has an outwardly directed flange 162 at one end thereof that rests upon the outer surface of the adjacent pole piece 120 and is hermetically sealed thereto as by brazing. An inturned and re-entrantly directed flange 163 is formed on the seal member 161 and completely surrounds an associated annular insulator 164 that surrounds the outer end of the associated conductor 144 or 155, as the case may be, the insulators 164 preferably being formed of ceramic and resting upon the outer surface of the associated pole piece 120. The flange 163 is hermetically sealed to the exterior cylindrical surface of the associated insulator 164, whereby to form a hermetic seal between each pole piece 120 and the associated insulator 164 and to provide mechanical interconnection therebetween as well as providing electrical insulation therebetween. The other end of each of the insulators 164 has an inwardly directed flange 165 thereon that engages the associated connector 153 or 158, as the case may be, the connectors 153 and 158 having outwardly directed flanges 153a and 158a, respectively, that engage and cooperate with the inwardly directed flanges 165 on the insulators 164. Each of the end structures 160 also includes a second seal member 166 that is essentially flat and is disposed upon the outer end of the associated insulator 164, the seal members 166 being formed of a good electrically conductive material that is nonmagnetic, the preferred material being "Fernico" alloy, the material also being of the type which can be readily hermetically sealed both to a metal surface and to a ceramic surface. Each of the seal members 166 has an annular flange 167 around the periphery thereof that embraces the adjacent end of the associated insulator 164 and is hermetically sealed thereto. An opening is formed centrally of the seal member 166 and a flange 168 is provided thereon that embraces and completely encircles a portion of the associated connector 153 or 158, as the case may be, and is hermetically sealed thereto, whereby each seal member 166 hermetically seals each of the associated insulators 164 to the associated connector 153 or 158. It will be understood that the end structures 160 each hermetically seals the associated end of the device 110 and also provides electrical insulation between the parts where necessary while providing mechanical support therebetween, the end structures more specifically supporting the rods 130 and the cathode 140 in a predetermined centered position with respect to the anode 111 and the anode segments 115 and recesses 116 therein.

Referring now to FIG. 2 of the drawings, the manner in which the crossed-field discharge device 110 is incorporated in the oscillator 100 will be described in further detail. A tubular conductor 107 is provided formed of a material that is electrically conductive, the preferred material being aluminum metal; the conductor 107 has an internal diameter substantially equal to the external diameter of the adjacent pole piece 120 and the adjacent end of the anode 111 (see FIG. 3 also) and is placed in telescoping relation therewith and is electrically connected thereto, the conductor 107 also being disposed within the upper magnetic yoke 132 and extending upwardly to the upper end thereof. As is illustrated, the connector 153 at the upper end of the crossed-field discharge device 110 has the outer external surfaces thereof threaded and extends into a complementarily threaded opening in the lower end of the terminal 102, whereby a good electrical connection is provided between the connector 153 and the terminal 102. The upper end of the terminal 102 passes beyond the upper end of the magnetic yoke 132 and into and through the output transmission line 65.

The outer annular conductor 107 is coupled to the outer conductor 66 of the output transmission line 65, and the terminal 102 is coupled to the inner conductor 67 of the output transmission line 65. More specifically, the capacitive coupler 80 is provided capacitively to couple the outer annular conductor 107 to an associated annular conductor 82 disposed therein with the adjacent ends thereof telescopically overlapping and having disposed therebetween a dielectric insulating sleeve 81, the sleeve 81 being formed of a synthetic organic plastic resin, the preferred resin being a tetrafluoroethylene resin sold under the trademark "Teflon." The conductor 82 is also preferably formed of aluminum metal and extends upwardly beyond the upper end of the conductor 107 and the upper end of the magnetic yoke 132 and into an opening provided in the lower portion of the outer conductor 66 of the output transmission line 65, the opening in the conductor 66 having a depending flange 65a disposed therearound and embracing the upper end of the annular conductor 82 and being mechanically and electrically secured thereto as by welding.

A coupler and filter assembly 83 is provided for the upper end of the terminal 102 so that the B— potential and the AC heater potential can be applied thereto by the conductor 61 and RF potentials can be taken therefrom and applied to the inner conductor 67 of the output transmission line 65 without any leakage of the RF potentials into the power supply 51 via the conductor 61. The coupler and filter assembly 83 includes an insulating dielectric sleeve 84 that surrounds the upper portion of the terminal 102, the sleeve 84 extending from a point spaced a short distance above the seal member 166 and upwardly past the upper wall of the outer conductor 66 of the output transmission line 65. The sleeve 84 is preferably formed of a synthetic organic plastic resin, the preferred resin being a tetrafluoroethylene resin sold under the trademark "Teflon." Surrounding the insulating sleeve 84 is a conductive sleeve 85 that is formed of a material having good electrically conductive properties, the preferred material being aluminum metal. The conductive sleeve 85 extends from a point spaced a short distance above the lower wall of the outer conductor 66 and upwardly beyond the top wall of the outer conductor 66, and has an outturned flange 86 that rests upon the upper surface of the top wall of the outer conductor 66. Disposed about the conductive sleeve 85 immediately below the lower surface of the top wall of the outer conductor 66 is an insulating block 63 also preferably formed of a synthetic organic plastic resin, the preferred resin being a tetrafluoroethylene resin sold under the trademark "Teflon." The insulating block 63 is generally cylindrical in shape and closely fits about the conductive sleeve 85 and extends from the lower surface of the top wall of the conductor 66 downwardly to the upper surface of the inner conductor 67. Disposed below the inner conductor 67 and engaging the outer surface of the conductive sleeve 85 is a locking nut 64 that presses the inner conductor 67 against the lower end of the insulating block 63 which in turn presses the top wall of the outer conductor 66 against the under surface of the outturned flange 86 on the conductive sleeve 85, whereby to clamp all of the parts in positions illustrated. An insulating washer 87, preferably formed of mica, overlies the flange 86 and receives the upper end of the insulating sleeve 84 through an opening therein. Disposed on top of the insulating washer 87 is a conductive washer 88, preferably formed of copper, to which electrical connection is made for the conductor 61. Finally, the outer end of the terminal 102 is threaded as at 102a and carries a nut 89, preferably formed of steel, which serves to clamp the washers 87 and 88 against the outturned flange 86 and to hold the conductive washer 89 in electrical connection with the terminal 102.

A second tubular conductor 108 is provided formed of a material that is electrically conductive, the preferred material being aluminum metal; the conductor 108 also has an internal diameter substantially equal to the external diameter of the adjacent pole piece 120 and the external diameter of the adjacent end of the anode 111 (see FIG. 3 also) and is placed in telescoping relation therewith and is electrically connected thereto, the conductor 108 also being disposed within the lower magnetic yoke 136 and extending downwardly and to the lower end thereof. As is illustrated in both FIGS. 2 and 3, the connector 158 at the lower end of the crossed-field discharge device 110 has the outer external surfaces thereof threaded and extends into a complementarily threaded opening in the upper end of the terminal 103, whereby good electrical connection is provided between the connector 158 and the terminal 103, the lower end of the terminal 103 extending well beyond the lower end of the associated magnetic yoke 136.

A coupler and filter assembly 90 is provided for the terminal 103 so that the AC heater potential can be applied thereto via the conductor 62 without leakage of any RF potentials associated with the crossed-field discharge device 110 into the power supply 51 via the conductor 62. The coupler and filter assembly 90 includes an insulating dielectric sleeve 91 that surrounds the lower portion of the terminal 103, the sleeve 91 extending from a point just below the associated seal member 166 downwardly and outwardly beyond the lower end of the magnetic yoke 136; the sleeve 91 is preferably formed of a synthetic organic plastic resin, the preferred resin being a tetrafluoroethylene resin sold under the trademark "Teflon." Surrounding the insulating sleeve 91 is a conductive sleeve 92 that is formed of a material having good electrically conductive properties, the preferred material being aluminum metal. The upper end of the conductive sleeve 92 is spaced downwardly a short distance from the upper end of the insulating sleeve 91 and the sleeve 92 extends downwardly beyond the magnetic yoke 136 and has an outturned flange 93 thereon. An insulating washer 94, preferably formed of mica, underlies the flange 93 and receives the lower end of the insulating sleeve 91 through an opening therein. Disposed below the insulating washer 94 is an electrically conductive washer 95, preferably formed of copper, to which electrical connection is made for the conductor 62. Finally, the outer end of the terminal 103 is threaded as at 103a and carries a nut 96, preferably formed of steel, which serves to clamp the washers 94 and 95 against the outturned flange 93, thereby to provide a good electrical connection between the conductive washer 95 and the terminal 103.

During the operation of the crossed-field discharge device 110, the anode 111 and the rods 130 cooperate to provide a portion of a coaxial transmission line within the device 110, the coaxial transmission line thus formed accommodating axially extending RF waves therein. The anode 111 and the cathode structure 140 also cooperate to provide a portion of another axial transmission line that also accommodates axially extending RF waves therein. Further, the rods 130 and the cathode structure 140 cooperate to provide a portion of yet another coaxial transmission line for accommodating axially extending RF waves therein.

As a consequence of this fundamental characteristics of the crossed-field discharge device 110, the oscillator 100 can be formed by connecting a section of coaxial transmission line between the anode 111 on the one hand and the interconnected rods 130 and cathode 140 on the other hand, and shorting the coaxial transmission line at a point to provide a cavity that is resonant at the desired operating frequency. Such a connection is illustrated in FIG. 2 of the drawings, wherein a tuned circuit 180 is provided at the upper end of the device 110 including the tubular conductor 82 serving as the outer conductor and a tubular conductor 182 serving as the inner conductor of a coaxial transmission line for the tuned circuit 180. The outer conductor 82 is capacitively coupled by the coupler 80 to the conductor 107 and thence to the anode 111, and the inner conductor 182 is capacitively coupled to the terminal 102, the conductor 182 surrounding the terminal 102 and being spaced therefrom and having interposed therebetween an extension of the dielectric insulating sleeve 84. To form a tuned resonant cavity, it is necessary only to provide an RF short between the concentric conductors 82 and 182 at a point spaced a predetermined distance from a plane normal to the axis of the anode 111 disposed midway between the end walls 113 and 114 thereof, the predetermined distance being equivalent to ¼ of the wavelength of the desired frequency of operation of the oscillator 100. As illustrated in FIG. 2, such an RF short is provided by a cylinder 183 disposed between the outer end of the conductor 182 and the cooperating conductor 82, the cylinder 183 providing an RF short between the concentric conductors 82 and 182; to this end the cylinder 183 is formed of a material having a high magnetic permeability so as to improve the shape and uniformity of the magnetic field in the device 110, the preferred material being steel; the exposed surfaces of the cylinder 183 are copper plate to improve the conductivity thereof with respect to RF energy.

A like tuned circuit 185 is provided at the lower end of the device 110 including the tubular conductor 108 serving as the outer conductor and the tubular conductor 92 serving as the inner conductor of a coaxial transmission line for the tuned circuit 185. The outer conductor 108 is directly connected to the anode 111, and the inner conductor 92 is capacitively coupled to the terminal 103, the conductor 92 surrounding the terminal 103 and being spaced therefrom and having interposed therebetween the insulating sleeve 91. To form a tuned resonant cavity, it is necessary only to provide an RF short between the concentric conductors 108 and 92 at a point spaced a predetermined distance from a plane normal to the axis of the anode 111 disposed midway between the end walls 113 and 114 thereof, the predetermined distance being equivalent to ¼ of the wavelength of the deisred frequency of operation of the oscillator 100. As illustrated in FIG. 2, such an RF short is provided by a cylinder 186 disposed between the outer end of the conductor 108 and the cooperating conductor 92, the cylinder 186 providing an RF short between the conductors 108 and 92; to this end the cylinder 186 is formed of a material having a high magnetic permeability so as to improve the shape and uniformity of the magnetic field in the device 110, the preferred material being steel; the exposed surfaces of the cylinder 186 are copper plated to improve the conductivity thereof with respect to RF energy.

In the operation of the oscillator 100, it is necessary to produce within the crossed-field discharge device 110 a predetermined pattern of electrical fields and magnetic fields. A description of the electrical fields and magnetic fields within the device 110 during the operation thereof as an oscillator and the method of creating those fields will now be given. The operating potentials for the device 110 are derived from the power supply 51 described above, and more particularly, the B+ and B− potentials from the power supply 51 are derived from the output terminals 54 and 55, the conductor 60 interconnecting the output terminal 54 of the power supply 51 to the input terminal 101 which is connected via the magnet coil 131, the conductor 134, the magnet coil 135, the conductor 138 and the fin 129 to the anode 111 to supply B+ potential thereto, and the conductor 61 interconnecting the output terminal 55 of the power supply 51 to the terminal 102 which is connected via the connector 153, the conductors 144 and 145 and the upper plate 125 to the cathode 140 to supply B— potential thereto. The heater supply is derived from the power supply output terminal 56 and 57, the terminal 56 being connected by the conductor 61 to the terminal 102 that is in turn connected via the connector 153, and the cnoductors 144 and 145 to one terminal of the heater 151, and the terminal 57 being connected by the conductor 62 to the terminal 103 that is in turn connected via the connector 158 and the conductors 155 and 156 to the other terminal of the heater 151.

The application of the above described B+ and B— potentials to the anode 111 and the cathode 140, respectively, establishes a unidirectional electrical field 190 (see FIG. 6) that extends between the anode segments 115 and the cathode projections 147 and between the rods 130 and the anode 111. The portion of the unidirectional electrical field 190 disposed between the anode segments 115 and the cathode 140 is designated by the numeral 190a, and the portion of unidirectional electrical field 190 extending between the rods 130 and the anode 111 is designated by the numeral 190b. The electrical field 190 extends substantially normal to the longitudinal axis of the anode 111, the field lines entering the surfaces 117, the surfaces of the rods 130 and the cathode surfaces 143 normal thereto, whereby the field 190 takes the shape illustrated in FIG. 6.

Figure 7:
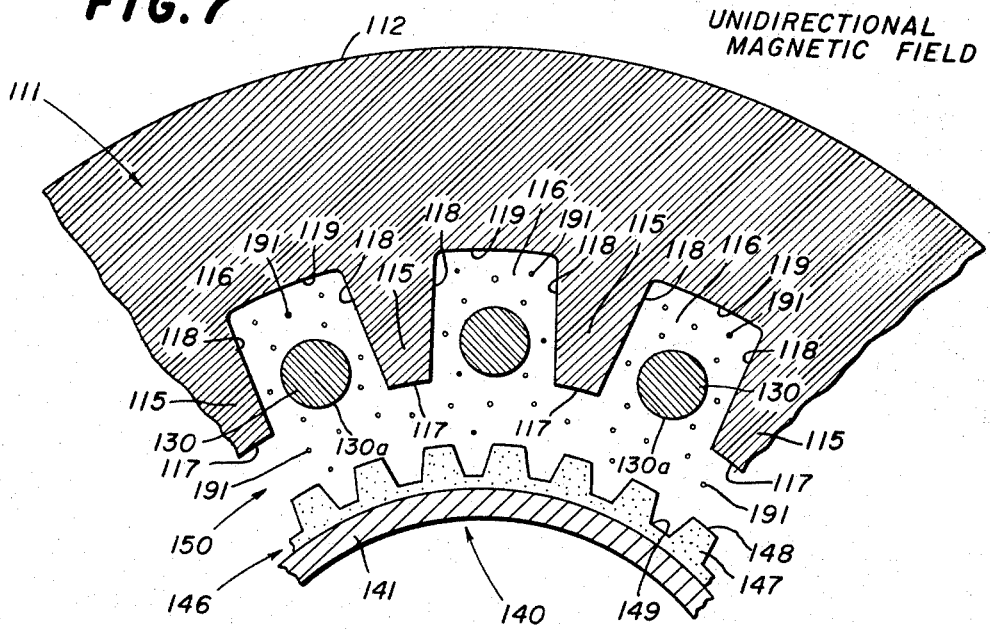

In order to provide the necessary unidirectional magnetic field normal to or "crossed" with respect to the elecrtical field 190, a DC current is established in the magnet coils 131 and 135. More particularly, electrons flow from the anode 111 through the conductor 138, the magnet coil 135, the conductor 134, the magnet coil 131 and the conductor 60 to the power supply output terminal 54. When such a flow of electrons is established through the magnet coils 131 and 135, a strong unidirectional magnetic flux is established through a path including the upper flange 133, the magnetic yoke 132, the upper pole piece 120 (see FIG. 3 also), and through the interaction space 150, and then through the lower pole piece 120, the magnetic yoke 136 and the flange 137. The return path for the unidirectional magnetic field is provided through the casing 105 that is formed of a material that is magnetically permeable. Referring to FIG. 7 of the drawings, the unidirectional magnetic flux lines extending through the interaction space 150 are designated by the numeral 191, the flux liens 191 extending axially through the interaction space 150 and therefore normal to the plane of the sheet of drawing in FIG. 7. Due to the provision of the pole pieces 120, and the other portions of the magnetic path having a high magnetic permeability described above, there is uniform distribution of the unidirectional flux lines 191 through the recesses 116 about the rods 130 and inwardly to the outer surface of the electron emissive coating 146. It further is pointed out that the unidirectional magnetic flux lines are disposed normal with respect to the unidirectional electrical field 190 illustrated in FIG. 6, whereby the unidirectional electrical field 190 and the unidirectional magnetic field 191 provide the necessary "crossed" fields for the operation of the crossed-field discharged device 110.

As has been pointed out above, the anode 111 and the cathode 140 with the rods 130 attached thereto cooperate to provide a coaxial transmission line that extends axially with respect to the device 110 and that is open at both ends within the device 110. In the oscillator 100, the open ended transmission line thus provided by the anode 111 and the cathode structure 140 with the rods 130 connected thereto has connected to the upper end thereof the external coaxial transmission line comprised of the concentric conductors 82 and 182, the conductors 82 and 182 being shorted by the RF short 183 to provide the tuned resonant cavity 180 that is a part of the resonant circuit for the oscillator 100. The open ended transmission line thus provided by the anode 111 and the cathode structure 140 with the rods 130 connected thereto has connected to the lower end thereof an external coaxial transmission line comprised of the concentric conductors 108 and 92, the conductors 108 and 92 being shorted by the RF short 186 to provide a tuned resonant cavity 185 that is a part of the resonant circuit for the oscillator 100. More specifically, the tuned resonant circuit for the oscillator 100 is the cavity that extends between the RF shorts 183 and 186 including the resonant cavity 180 and the resonant cavity 185 and the space between the anode 111 and the cathode structure 140 with the rods 130 attached thereto within the device 110. When the tuned resonant circuit thus formed is excited by the establishment of the unidirectional electrical field 190 of FIG. 6 and the undirectional magnetic field 191 of FIG. 7, the resonant circuit resonates at a frequency having a wavelength equivalent to twice the distance between the facing surfaces of the RF shorts 183 and 186, i.e., a standing RF wave is established within the tuned resonant circuit and extends axially thereof and axially of the device 110 and through the interaction space 150 thereof.

There is believed to be associated with the standing RF wave thus established an RF electrical field disposed normal to the axis of the device 110, a diagrammatic representation of the field being illustrated in FIG. 8. From FIG. 8 it will be seen that at any moment the anode segments 115 have one RF polarity while the rods 130 and the cathode structure 140 have the opposite RF polarity, whereby there is a relatively strong RF electrical field between the anode 111 and the cathode structure 140 as well as a stronger RF electrical field between the anode 111 and the rods 130 and a strong RF field between the rods 130 and the cathode structure 140. In FIG. 8, the instantaneous RF electrical field has been designated by the numeral 192, and the strong portion thereof disposed between the anode 111 and the cathode structure 140 has been designated 192b, the force lines being disposed normal to the surfaces associated therewith, i.e., normal to the inner surfaces 117 of the anode segments 115 and the outer surfaces 148 of the cathode projections 147. There is a stronger portion of the RF electrical field disposed between the anode 111 and the rods 130, that portion of the field being designated by the numeral 192a, the lines represented by the portion 192a of the field being normal to the side walls 118 and the outer wall 119 of the recesses 116 and the surfaces of the rods 130. Finally, there is a relatively strong portion of the RF electrical field between the rods 130 and the cathode structure 140, that portion of the field being designated by the numeral 192c, the lines represented by the portion 192c of the field also being disposed normal to the associated surfaces, and specifically normal to the outer surfaces of the rods 130 and normal to the outer surfaces 148 of the associated cathode projections 147.

Associated with the RF electrical field 192 of the standing RF wave is an RF magnetic field 193 which is believed to have the form illustrated in FIG. 9; the RF magnetic field 193 is also disposed normal to the axis of the device 110 and is concentrated in the interaction space 150 and surrounding the cathode structure 140, and surrounding the rods 130. The major portion of the RF magnetic field 193 is disposed about the cathode structure 140, this portion of the magnetic field being designated by the numeral 193b, and the smaller portion of the RF magnetic field 193b is disposed about the rods 130, this latter portion being designated by the numeral 193a.

After the application of the operating potentials to the device 110, and after the cathode structure 140 has been heated to the operating temperature thereof by the heater 151, electrons are emitted from the emissive coating 146, the electrons being emitted into the interaction space 150 where they are subjected to the action of the unidirectional fields and the RF fields described hereinabove. There is illustrated in FIG. 10 of the drawings a diagrammatic illustration of what are believed to be typical paths of electrons emitted from the cathode projections 147, the electron paths being designated by the numeral 194. As is illustrated, the electrons follow a spiral path, the initial direction of flow being in a clockwise direction, this being due to the influence of the unidirectional magnetic field described above. Eventually, the spiral paths 194 of the electrons carry them into contact with the anode 111 or the rods 130, whereby to complete an electrical circuit through the device 110. During the time that the electrons are in the spiral paths 194, they impart a portion of the energy content thereof to the RF standing wave within the device 110 to add power thereto and to reinforce the RF standing wave.

There is illustrated in FIG. 11 of the drawings a composite representation of all of the fields that are believed to be present in the device 110 and in the interaction space 150 thereof when the device 110 is operating as a part of the oscillator 100. From FIG. 11 it is apparent that the electrons in the paths 194 clearly interact with the unidirectional fields and the RF fields within the interaction space 150, whereby to give up a portion of the energy of the electrons to the RF fields within the interaction space 150. In this manner the RF standing wave within the device 110 is maintained and the energy content thereof increased and replenished during the operation of the oscillator 100.

As is best seen from FIGS. 2, 3 and 11, the cathode structure 140 is coupled to the RF standing wave within the interaction space 150 and therefor serves as a probe for the removal of a portion of the RF energy from the tuned cavity for the supplying thereof to the output transmission 65. The output from the device 110 and the output from the oscillator 100 appears as an RF potential between the anode 111 and the cathode structure 140, the anode 111 being capacitively coupled by the coupler 80 to the output conductor 82 which is directly connected to the outer conductor 66 of the output transmission line 64. The conductive sleeve 85 has a length equivalent to ¼ of the wavelength of the operating frequency of the oscillator 100 and has the flange 86 thereof in electrical contact with the outer conductor 66. The dielectric insulating sleeve 84 couples the output terminal 102 connected to the cathode 140 to the conductive sleeve 85, whereby the RF potential between the anode 111 and the cathode structure 140 is coupled across the conductive sleeve 85, the maximum RF potential being at the lower end of the conductive sleeve 85 and the minimum RF potential being at the upper end thereof. A portion of the RF potential developed along the conductive sleeve 85 is coupled therefrom by the connection of the inner conductor 67 to an intermediate point therealong, whereby to provide an RF potential between the outer conductor 66 and the inner conductor 67 of the output transmission line 65. The described connection can be considered to be an auto-transformer wherein the outer conductor 66 is connected to one end of the transformer, the cathode terminal 102 is capacitively coupled to the other end of the transformer, and the inner conductor 66 is connected to an intermediate point on the transformer.

The coupler and filter assembly 83 further serves to prevent coupling of the RF energy derived from the oscillator 100 to the conductor 61. The filter comprises the conductive sleeve 85 which in cooperation with the terminal 102 and the insulating sleeve 84 forms a low impedance transmission line. The terminal 102 also forms with the outer conductor 82 a high impedance transmission line. At the junction at the lower end of the conductive sleeve 85, there is a substantial mismatch of the high impedance transmission line and the low impedance transmission line resulting in a large reflection of RF energy attempting to flow in the low impedance transmission line formed by the cathode terminal 102 and the conductive sleeve 85. The washer 88 in cooperation with the outer conductor 66 can be considered to be another transmission line of high impedance at the junction therebetween such that there is a substantial mismatch with the transmission line comprised of the cathode terminal 102 and the conductive sleeve 85 which has a relatively low impedance, and consequently there is a large reflection of RF energy back into the oscillator 100 and away from the conductor 61. When the transmission line including the cathode terminal 102 and the conductive sleeve 85 with the insulating sleeve 84 therebetween is made to have a length equivalent to ¼ of the wavelength of the frequency of operation of the oscillator 100, a maximum attenuation is attained, the RF energy within the oscillator 100 flowing from the terminal 102 to the conductive sleeve 85 through the outer conductor 66 back to the device 110. Substantially no RF energy then flows through the line including the terminal 102 and the conductive sleeve 85 and to the washer 88 and the attached conductor 61.

The coupler and filter assembly 90 operates in a manner like the coupler and filter assembly 83, the constructoin and theory of operation being the same, and accordingly, a detailed description thereof will not be given in the interest of brevity, it merely being pointed out that the conductive sleeve 92 has a length equivalent to ¼ of the wavelength of the frequency of operation of the oscillator 100 and the conductive RF short 186 performs the same function in the operation of the coupler and filter assembly 90 as the outer conductor 66 performs in the operation of the coupler and filter assembly 83.

As has been explained above, the RF wave present within the oscillator 100 is disposed axially with respect to the device 110, there being no radial RF waves within the device 110, i.e., no RF waves extending normal to the axis of the device 110. Furthermore, the radial distance between the outer surfaces of the cathode structure 140 and the outer wall 119 of the anode recesses 116 is less than that required to accommodate a radial standing wave at the operating frequency of the oscillator 100. In fact, the radial distance between the outer surface of the cathode structure 140 and the outer wall 119 of the anode recess 116 is less than that required to accommodate a radial standing wave at an operating frequency having a wavelength corresponding to twice the distance between the ends of the anode 11, whereby there could be no radial RF standing wave even if it were possible to short the transmission line formed by the anode 111 and the terminal 102 at the outer ends of the anode 111.

In a constructional example of the crossed-field discharge device 110, the various parts thereof have the following dimensions. The anode 111 has an external diameter of 1⅜ inch, an overall length of 2⅛ inches, a distance from the longitudinal axis to the surface 117 of ⅜ inch, a distance from the longitudinal axis to the surfaces 119 of ½ inch, a radial dimension of the recesses 116 of ⅛ inch, a circumferential dimension of the recesses 116 of ⅛ inch and a circumferential dimension of the surfaces 117 of 3/32 inch. The rods 130 have a diameter of 1/16 inch and a length between adjacent surfaces of the pole pieces 120 of 1 9/16 inches, and the inner surfaces 130a are disposed outwardly with respect to the adjacent surfaces 117 a distance of 0.005 inch. The cathode structure 140 has an overall diameter of 21/32 inch and a length of the emissive coating 146 of 1⅛ inches; the projections 147 have a radial extent of 1/32 inch, the surfaces 148 have a circumferential extent of 1/32 inch, and the spaces 149 have a circumferential extent of 1/32 inch. The spacing between the anode surfaces 117 and the cathode surfaces 148 is 1/16 inch. The annular displacement between the center line of a cathode projection 147 and the center line of the adjacent anode segment 115 or rod 130 is 3°. The pole pieces 120 each has a diameter of 1⅜ inches and a thickness of ⅛ inch. The longitudinal extent of each of the insulating sleeves 164 is ¾ inch and the external diameter thereof is ½ inch.

Referring to FIG. 12 of the drawings, there is diagrammatically illustrated to the manner in which the output from the oscillator circuit 50 can be connected to the input of an amplifier circuit 200 which embodies therein certain additional features of the present invention. Inasmuch as the construction and operation of the power supply 51 and the oscillator 100 in the circuit of FIG. 12 are identical to those described above, like reference numerals have been supplied to like parts and the description thereof will not here be repeated. It will be understood that the output of the oscillator 100 is applied to a coaxial transmission line 210 which has the outer conductor 211 thereof capacitively coupled by the coupler 80 to the outer conductor 107, and the outer transmission line 211 is in turn coupled by capacitive couplers 225 to a cavity connected to one end of a crossed-field discharge device 110 of the type set forth above. The transmission line 210 also comprises an inner conductor 212 capacitively coupled by the coupler and filter 83 to the terminal 102, the inner conductor 212 terminating in a radiating probe 213 that radiates into a cavity formed by a coaxial transmission line 220 connected as the input to the lower end of the device 110 (see FIG. 13 also). The amplifier circuit 200 also includes a pair of input terminals 201 and 202 that are respectively connected to the DC output terminals 54 and 55 of the power supply 51 by means of the conductors 60 and 61, respectively. The input terminal 202 is also connected by the conductor 61 to the low voltage AC output terminal 56 of the power supply 51. A third input terminal 203 is provided for the amplifier circuit 200, the input terminal 203 being connected by the conductor 62 to the low voltage AC output terminal 57 of the power supply 51.

The output of the amplifier circuit 200 is applied to a cavity including the outer conductor 247 that is capacitively coupled by the coupler 245 to an output transmission line 240 that connects with the transmission line 65. More specifically, the outer conductor of the transmission line 240 is directly connected to the outer conductor 66 of the transmission line 65 and a coupling probe 252 is provided within the transmission line 240 and is connected to the inner conductor 67 of the output transmission line 65. The capacitive coupling provided by the coupler 245 is desirable and necessary since the output terminal 247 is at a relatively high DC potential, whereby it is necessary electrically to isolate the output terminal 247 from the outer conductor 66 so that the outer conductor 66 can be grounded. As has been pointed out above, it is inherent in the construction and operation of the power supply 51, which is of the voltage doubler and rectifier type, that neither the conductor 60 nor the conductor 61 can be grounded, whereby it is also not possible to ground the output terminal 247 of the amplifying circuit 200. Accordingly, it is also necessary and desirable that the amplifier circuit 200 be electrically shielded by a grounded outer housing (not shown) disposed therearound in order to prevent a user of the amplifier circuit 200 from being placed in contact with relatively high DC voltages if the user should accidentally come in contact with the amplifying circuit 200.

The microwave energy supplied from the amplifier circuit 200 to the transmission line 65 can be used for any desired purpose, two typical uses of the microwave energy being illustrated in FIG. 12, the first use being illustrated in the upper righthand portion of FIG. 12, and the second use being illustrated in the lower righthand portion of FIG. 12. Referring to the first use illustrated in the upper righthand portion of FIG. 12, the transmission line 65 is shown coupled to an antenna of the type commonly used in search radar, the outer conductor 66 being connected to outer radiating or antenna elements 68, and the inner conductor 67 being connected in an inner radiating or antenna element 69, the antenna elements 68 and 69 serving to match the impedance of the transmission line 65 to the impedance of the atmosphere. Referring to the second use of the microwave energy illustrated in the lower righthand portion of FIG. 12, the transmission line 65 is shown coupled to an electronic heating apparatus, such as the electronic range 70 illustrated that is especially designed for home use. The electronic range 70 in FIG. 12 is identical to the electronic range 70 described above with respect to FIG. 1 of the drawings, and accordingly, like reference numerals have been applied to like parts throughout. The microwave energy within the transmission line 65 is radiated into the internal cavity of the electronic range 70 to provide the power for heating materials disposed therein. It further will be understood that in a preferred embodiment of the range 70, the power supply 51, the oscillator 100, and the amplifying circuit 200 together with the transmission line 65 are all preferably disposed within a common housing that also includes the casing 71, the common housing preferably being formed of metal and grounded for safety purposes.

Further details of the construction of the amplifier circuit 200 and the connections thereof to the crossed-field discharge device 110 incorporated therein will now be described with reference to FIG. 13 of the drawings. The construction of the crossed-field discharge device 110 incorporated in the amplifier circuit 200 of FIG. 13 is identical to the construction of the crossed-field discharge device 110 described above with reference to the oscillator 100 and illustrated in detail in FIGS. 3 to 5 of the drawings, whereby like reference numerals have been applied to like parts throughout including the magnet coils 131 and 135, the magnetic yokes 132 and 136 and the associated mechanical and electrical connections. As illustrated, the input coaxial transmission line 210 includes an annular outer conductor 211 within which is disposed an inner conductor 212, the lefthand end of the outer conductor 211 communicating with an outer coaxial transmission line 220 that is connected to the lower end of the device 110. More specifically, the coaxial transmission line 220 includes an outer annular conductor 221 within which is disposed an annular inner conductor 222, the lower and outer ends thereof being interconnected and the space therebetween closed by an end wall 223. An opening is formed adjacent to the lower end of the outer conductor 221 and the outer conductor 211 is mechanically and electrically connected thereto in surrounding relationship with the opening therein. Connected between the input transmission line conductors 211 and 212 is a radiating probe 213 that serves to radiate the microwave energy within the input transmission line 210 into the coaxial transmission line 220. The outer conductor 221 extends upwardly toward the lower end of the anode 111 and is capacitively coupled thereto by a coupler 225; more particularly, the outer annular conductor 227 is mechanically and electrically connected to the anode 111 and extends downwardly to the lower end of the magnetic yoke 136 and surrounds the adjacent portion of the outer conductor 221, an insulating dielectric sleeve 226 being disposed between and substantially filling the annular space between the concentric conductors 221 and 227, the sleeve 226 being formed of a synthetic organic plastic resin, the preferred resin being a tetrafluoroethylene resin sold under the trademark "Teflon." The inner conductor 222 extends upwardly toward the lower end of the cathode 140 and is capacitively coupled thereto by a coupler 230; more particularly, an outer terminal 203 is threadedly connected at the upper end thereof to the connector 158 that is in turn connected to the cathode 140 via the heater 151 and is capacitively coupled to the cathode 140 at the lower end thereof, the terminal 203 extending downwardly beyond the end wall 223 and being disposed within and surrounded by the inner conductor 222, an insulating dielectric sleeve 231 being disposed between and substantially filling the annular space between the terminal 203 and the conductor 222, the sleeve 231 being formed of a synthetic organic plastic resin, the preferred resin being a tetrafluoroethylene resin sold under the trademark "Teflon."

The output from the amplifier circuit 200 is taken from the upper end of the crossed-field discharge device 110, the output being taken from a coaxial transmission line 240 connected to the upper end of the device 110. More specifically, the coaxial transmission line 240 includes an outer annular conductor 241 within which is disposed an annular inner conductor 242, the upper and outer ends thereof being interconnected and the space therebetween closed by an end wall 243. An opening is formed adjacent to the upper end of the outer conductor 241 and the outer conductor 66 of the output transmission line 65 is mechanically and electrically connected thereto in surrounding relationship with the opening therein. Connected between the output transmission line conductors 66 and 67 is a probe 252 that serves to pick up the microwave energy within the output transmission line 240 and to apply the microwave energy to the output transmission line 65. The outer conductor 241 extends downwardly toward the upper end of the anode 111 and is capacitively coupled thereto by a coupler 245; more particularly, an outer annular conductor 247 is mechanically and electrically connected to the anode 111 and extends upwardly to the upper end of the magnetic yoke 132 and surrounds the adjacent portion of the outer conductor 241, an insulating and dielectric sleeve 246 being disposed between and substantially filling the annular space between the concentric conductors 241 and 247, the sleeve 246 being formed of a synthetic organic plastic resin, the preferred resin being a tetrafluoroethylene resin sold under the trademark "Teflon." The inner conductor 242 extends downwardly toward the upper end of the cathode 140 and is capacitively coupled thereto by a coupler 250; more particularly, an output terminal 202 is provided having the lower end thereof threadedly attached to the connector 153 that is in direct electrical connection with the upper end of the cathode 140 and extends upwardly therefrom and outwardly beyond the end wall 243, the inner annular conductor 242 surrounding the adjacent portion of the terminal 202, an insulating dielectric sleeve 251 being disposed between and substantially filling the annular space between the terminal 202 and the conductor 242, the sleeve 251 being formed of a synthetic organic plastic resin, the preferred resin being a tetrafluoroethylene resin sold under the trademark "Teflon."

The conductor 60 that is connected to the B+ output terminal 54 of the power supply 51 is connected as at 201 to one terminal of the magnet coil 131, whereby to apply the B+ potential to the anode 111 of the device 110 through the magnet coil 131, the conductor 134, the magnet coil 135, the conductor 138 and the connection 139 to one of the cooling fins 129 that is electrically connected to the anode 111. The conductor 61 that is connected both to the B— output terminal 55 of the power supply 51 and one of the terminals 56 carrying the low voltage AC output for the heater 151 is attached to the terminal 202 that is in turn directly connected to the cathode 140 through the connector 153, the conductor 144 and the bushing 143. Finally, the other terminal 57 of the power suply 51 carying the low voltage AC output for the heater 151 is connected by the conductor 62 to the terminal 203 that is in turn connected to the other end of the heater 151.

The microwave energy to be amplified in the amplifier circuit 200 is applied thereto through the input transmission line 210, and more particularly, the probe 213 radiates into the coaxial transmission line 220 that is capacitively coupled both to the anode 111 and the cathode 140, thereby to apply the input energy between the anode 111 and the cathode 140. In order to provide a suitable match between the impedance of the transmission line 210 and the impedance of the amplifier circuit 200, the transmission line 220 preferably has a length equivalent to ¾ of the wavelength of the energy to be amplified, i.e., the distance between the inner surface of the outer wall 223 and a plane normal to the axis of the device 110 and disposed midway between the ends of the anode 111 is equivalent to ¾ of the wavelength of the microwave energy to be amplified. It would also be permissable to connect the transmission line 210 to the transmission line 220 at a point spaced ¼ of the wavelength of the microwave energy to the amplifier from the midplane of the device 110, but for more frequencies to be amplified it is not possible to make the necessary electrical connections at this point as illustrated in FIG. 13.

In order to provide a suitable match between the impedance of the output transmission line 65, the transmission line 240 preferably has a length equivalent to ¾ of the wavelength of the microwave energy to be amplified, i.e., the distance between the inner surface of the end wall 243 and a plane normal to the axis of the device 110 and disposed midway between the ends of the anode 111 is equivalent to ¾ of the wavelength of the microwave energy to be amplified. It would also be permissable to connect the transmission line 65 at a point spaced ¼ of the wavelength of the microwave energy being amplified from the midplane of the device 110, but for most frequencies it is not possible to make the necessary electrical connections at this point as illustrated in FIG. 13.

The microwave energy thus injected into the lower end of the amplifier circuit 200 passes into the crossed-field discharge device 110 and specifically along the coaxial transmission line provided by the cooperation between the cathode 140 and the interconnected rods 130 therein forming one conductor and the anode 111 forming the other conductor. As the microwave energy passes through the device 110, the RF fields associated therewith are reinforced and augmented by interaction with the electrons that pass from the cathode 140 to the anode 111. It is believed that the amplifying circuit 200 operates in accordance with the M-type fast wave interaction principles, whereby the input microwave energy in passing through the interaction space 150 interacts with the fields disposed therein, and the power content of the microwave energy is augmented and amplified so that a microwave energy output is obtained between the anode 111 and the cathode 140 at the other end of the device 110 that has the same frequency as the microwave energy supplied through the input transmission line 210, but has a power content substantially greater than the power content of the microwave energy supplied via the transmission line 210, the power amplification being for example in the range from about 6 to 10. It has been found that the single interaction space 150 achieves this substantial amplification although the length thereof is on the order of about only 0.1 times the wavelength of the energy being amplified, whereas prior devices have required lengths of the interaction space that are many times the wavelength of the microwave energy being amplified, for example as many as twenty times the length of the wavelength of the microwave energy being amplified.

The output microwave energy appears between the conductors 241 and 242, the conductor 241 being capacitively coupled by the coupler 245 to the anode 111 and the conductor 242 being capacitively coupled by the coupler 250 to the cathode 140. The microwave energy in the transmission line 240 formed by the concentric conductors 241 and 242 is coupled by the probe 252 to the input transmission line 65, and specifically between the outer conductor 66 and the inner conductor 67 thereof.

It is pointed out that there is no cutoff frequency for the amplifier circuit 200 since the device 110 essentially comprises an open ended transmission line formed by the cooperation of the cathode 140 and the interconnected rods 130 serving as one conductor and the anode 111 serving as the other conductor, whereby a wide spectrum of microwave energy can be amplified utilizing the amplifier circuit 200. The power gain, however, is a function of the bandwidth of the system which is determined by the Q of the cavity that is formed by the cooperation of the input transmission line 220 and the device 110; a large bandwidth requiring a lower Q results in a lower power gain, and conversely, a small bandwidth requiring a higher Q results in a higher power gain. The power gain is also a function of the length of the interaction space 150 in the device 110, a greater length of the interaction space 150 providing a greater power gain, and conversely, a smaller length of the interaction space 150 providing a smaller power gain.

To further illustrate the characteristics of the amplifier circuit 200, there are illustrated in FIG. 13 test connections of the input transmission line 210 and the output transmission line 65 by means of which other characteristics of the amplifying circuit 200 may be illustrated. The oscillator 100 as illustrated in FIG. 13 has the output thereof connected by a transmission line 270 to the input of an attenuator 272, a wave meter 271 also being connected to the transmission line 270 so that the frequency of the microwave energy supplied to the transmission line 270 can be monitored. The output from the attenuator 272 is applied by a transmission line 273 to the input of a tuner 274 which in turn has the output thereof connected to the input transmission line 210. The output transmission line 65 is connected to the input of an output tuner 275 that in turn is connected by a transmission line 276 to a load 278 by which the power provided from the amplifying circuit 200 can be measured; also connected to the transmission line 276 is a wave meter 277 by which the frequency of the microwave energy within the transmission line 276 can be monitored.

In a first test of the amplifier circuit 200, the operating potentials were removed therefrom, i.e., the operating potentials applied via the conductors 60, 61 and 62 were removed; the input and output tuners 274 and 275, respectively, were adjusted to give maximum power transfer from the oscillator 100 into the load 278. When the operating potentials were then applied to the amplifier circuit 200 via the conductors 60, 61 and 62, the amount of microwave energy delivered to the load 278 was found to increase in proportion to the input power. The efficiency of amplification obtained was of the same order as that found when the device 110 was operated as a power oscillator as described above with reference to FIG. 2.

The frequency of the output energy delivered to the load 278 was then measured by means of the wave meter 277, and it was found that a single frequency of microwave energy was present in the transmission line 276, that frequency being the frequency of operation of the oscillator 100 as determined by the wave meter 271. The frequency of operation of the oscillator 100 was then varied to determine whether the frequency of the output was due to the tuning of the circuits in the amplifier circuit 200, and it was found that the output frequency of the amplified microwave energy as measured by the wave meter 277 varied directly in accordance with the variations in the frequency of operation of the oscillator 100 as determined by the wave meter 271, whereby it was concluded that there was no electronic tuning effect in the amplifier circuit 200. Further to verify that there was no operation of the amplifier circuit 200 as an oscillator, the operating potentials were removed from the oscillator 100 so that no output was obtained therefrom as measured by the wave meter 271. The output from the amplifier circuit 200 immediately dropped to zero indicating that there were no oscillations in the amplifier circuit 200, whereby to verify that the operation of the circuit 200 was truly as an amplifier and not as an oscillator.

Finally, the microwave energy to the amplifier circuit 200 was varied by means of the attenuator 272 over the range from 1 watt to 100 watts. It was determined that there was stable operation of the amplifier circuit 200 over the entire range of power input, the output from the amplifier 200 as measured by the load 278 being directly proportional to the power supplied as an input to the amplifier circuit 200 via the input transmission line 210.

There further are illustrated in FIG. 13 additional connections to the amplifier circuit 200 to accommodate the application of modulating signals thereto. More specifically, there is provided a resistor 280 having one terminal thereof connected by a conductor 281 to the tubular conductor 227 that is connected to the anode 111 of the device 110, the conductor 281 also being connected to a terminal 282; and the other terminal of the resistor 280 is connected by the conductor 62 to the terminal 203 that is directly connected to the cathode 140, the conductor 62 also being connected to a terminal 283. Accordingly, it will be seen that the input terminal 282 is directly connected to the anode 111 and the input terminal 283 is connected to the cathode 140 of the device 110. A modulating signal can be applied between the input terminals 282 and 283, whereby to modulate the amplitude of the microwave energy supplied by the output of the amplifier circuit 200 to the output transmission line 65.

There is illustrated in FIG. 14 of the drawings a crossed-field discharge device 310 that is a modification of the crossed-field discharge device 110, the device 310 differing from the device 110 fundamentally in the construction and arrangement of the cathode 340 thereof, whereby all of the other parts of the device 310 have the same construction and arrangement as do the corresponding parts in the device 110; therefore like reference numerals in the 300 series have been applied to the parts in the device 310 that are identical in construction and arrangement to parts in the device 110. The cathode 340 in the device 310 includes a cathode wall 341 conical in shape, the larger end of the conical wall 341 being disposed upwardly and the smaller end of the conical wall 341 being disposed downwardly. More specifically, the conical wall 341 is a section of a right cone and has the longitudinal axis thereof in alignment with the longitudinal axis of the anode 311 and the longitudinal axis of the device 310. A first outwardly directed flange 342 is provided at the upper end of the cathode wall 341 and is secured as by welding to the lower surface of the upper plate 325. A second outwardly directed flange 343 is disposed at the lower end of the cathode wall 341 and is secured as by welding to the upper surface of the lower plate 325.

The cathode wall 341 is provided with a sintered porous coating 346 impregnated with a suitable electron emissive oxide material, whereby upon heating of the cathode structure 340, the coating 346 readily emits electrons from the outer surface thereof. Preferably the coating 346 is provided with a plurality of outwardly extending projections (not shown) like the projections 147 described above, the projections on the coating 346 being oriented with respect to the anode segments 315 and the rods 330 in a manner like that described above when designating the relationship between the projections 147 and the anode segments 115 and the rods 130.

As illustrated, the cathode structure 340 is of the indirectly heated type, and accordingly, there has been provided within the conical cathode wall 341 a heater 351 in the form of a coiled filament extending substantially the entire length of the cathode wall 341 and spaced inwardly a short distance from the inner surface thereof; more particularly, the individual coils of the heater 351 are of decreasing diameter from the top to the bottom thereof with the outer surfaces of the heater 351 lying on a cone that is slightly smaller than the cathode wall 341. The upper end of the heater 351 has an outer end 352 that extends upwardly and into the lower end of the conductor 344 for mechanical and electrical connection thereto; the lower end of the heater 351 has an outer end 354 that extends downwardly and into the upper end of the conductor 355 for mechanical and electrical connection thereto.

The device 310 can be used both in the oscillator 100 described above and the amplifying circuit 200 described above. When connected as an oscillator, the output transmission line 65 in FIG. 2 is connected to the upper end of the device 310, i.e., to the end of the device 310 wherein the cathode 340 is spaced the minimum distance away from the anode 311. It has been found that the energy output of the oscillator is materially increased by utilizing the device 310 therein. When utilizing the device 310 in the amplifying circuit 200 in FIG. 13, the input transmission line 210 and associated structure is connected to the lower end of the device 310 as illustrated in FIG. 14, i.e., to the end of the device 310 at which the cathode 340 is spaced the greatest distance away from the anode 311 and wherein the cathode 340 has the smallest diameter; and the output transmission line 65 and associated structure is connected to the upper end of the device 310 as illustrated in FIG. 14, i.e., to the end of the device 310 wherein the cathode 340 is spaced the minimum distance from the anode 311, and wherein the cathode 340 has the largest diameter thereof. Utilization of the device 310 in the amplifier circuit 200 results in an improved power gain therethrough as compared to an amplifier circuit 200 incorporating the device 110 therein.

From the above it will be seen that there have been provided improved crossed-field discharge devices, improved microwave oscillator circuits incorporating the crossed-field discharge devices therein, and improved amplifier circuits incorporating the crossed-field discharge devices therein which fulfill all of the objects and advantages set forth above. More particularly, there have been provided improved crossed-field discharge devices for use at microwave frequencies which are of simple and economical construction and arrangement, the devices being particularly adapted for operation with low applied potentials between the anode and the cathode thereof. The improved crossed-field discharge devices provide a high output of microwave energy in proportion to the physical dimensions thereof, whereby to permit the miniaturization of microwave circuits amplifying the improved crossed-field discharge devices of the present invention.

While there have been described what are at present considered to be the preferred embodiments of the invention, it will be understood that various modifications may be made therein, and it is intended to cover in the appended claims all such modifications as fall within the true spirit and scope of the invention.

What is claimed is:

1. A crossed-field discharge device comprising, an anode structure defining an axially extending space, a pair of pole pieces respectively arranged adjacent to the opposite ends of said anode structure, an axially extending cathode structure disposed in said axially extending space and cooperating with said anode structure to define an axially extending annular interaction space, a first end structure joining corresponding first ones of the adjacent ends of said anode structure and said cathode structure and mechanically supporting said cathode structure with respect to said anode structure while providing electrical insulation therebetween, and a second end structure joining corresponding second ones of the adjacent ends of said anode structure and said cathode structure and mechanically supporting said cathode structure with respect to said anode structure while providing electrical insulation therebetween, said end structures enclosing and sealing both the ends of said anode structure and said axially extending space and being the only electrically insulating seals for said device.

2. A crossed-field discharge device comprising, an anode structure defining an axially extending space, a pair of pole pieces respectively arranged adjacent to the opposite ends of said anode structure, an axially extending cathode structure disposed in said axially extending space and cooperating with said anode structure to define an axially extending annular interaction space, a first connector electrically connected to one terminal of said cathode structure, a second connector electrically connected to the other terminal of said cathode structure, a first end structure joining one end of said anode structure and said first connector for mechanically supporting said cathode structure with respect to said anode structure while providing electrical insulation therebetween, and a second end structure joining the other end of said anode structure and said second connector for mechanically supporting said cathode structure with respect to said anode structure while providing electrical insulation therebetween, said end structures enclosing and sealing both the ends of said anode structure and said axially extending space and being the only electrically insulating seals for said device.

3. A crossed-field discharge device comprising an anode structure defining an axially extending space, a pair of pole pieces respectively arranged adjacent to the opposite ends of said anode structure, a plurality of axially extending anode segments on said anode structure and projecting radially into said axially extending space and providing a corresponding plurality of axially extending anode recesses therebetween, a plurality of rods respectively disposed in said anode recesses and respectively spaced from the adjacent ones of said anode segments, means electrically interconnecting said rods at corresponding ends thereof, an axially extending cathode structure disposed in said axially extending space and cooperating with said anode structure to define an axially extending annular interaction space, said cathode structure including an electron emissive element disposed within said anode structure and adjacent to the inner portion of said interaction space, means electrically interconnecting said rods and said cathode structure within said axially extending space, and end structures enclosing both the ends of said anode structure and said axially extending space.

4. The crossed-field discharge device set forth in claim 3, wherein said rods are electrically interconnected at both of the corresponding ends thereof.

5. The crossed-field discharge device set forth in claim 3, wherein said cathode structure includes an electron emissive element disposed within said anode structure and confined between the ends of said anode segments and disposed adjacent to the inner portion of said interaction space.

6. A crossed-field discharge device comprising an anode structure defining an axially extending space, a pair of pole pieces respectively arranged adjacent to the opposite ends of said anode structure, a plurality of axially extending anode segments on said anode structure and projecting radially into said axially extending space and providing a corresponding plurality of axially extending anode recesses therebetween, a plurality of rods respectively disposed in said anode recesses and respectively spaced from the adjacent ones of said anode segments, means electrically interconnecting said rods at corresponding ends thereof, an axially extending cathode structure disposed in said axially extending space and cooperating with said anode structure to define an axially extending annular interaction space, said cathode structure including a conically shaped electron emissive element disposed within said anode structure and adjacent to the inner portion of said interaction space with the axis of said element extending axially of said device, means electrically interconnecting said rods and said cathode structure within said axially extending space, and end structures enclosing both the ends of said anode structure and said axially extending space.

7. The crossed-field discharge device set forth in claim 6, wherein said emissive element is shaped as a section of a regular right cone having the ends thereof disposed within the ends of said anode structure.

8. A microwave oscillator comprising a crossed-field discharge device including an anode structure defining an axially extending space, a plurality of axially extending anode segments on said anode structure and projecting radially into said axially extending space and projecting radially into said axially extending space and providing a corresponding plurality of axially extending anode recesses therebetween, an axially extending cathode structure disposed in said axially extending space and cooperating with said anode structure to define an axially extending annular interaction space, said anode structure and said cathode structure cooperating to provide a portion of a coaxial transmission line for accommodating an axially extending RF wave therein, and end structures enclosing both the ends of said anode structure and said axially extending space; means for producing a unidirectional magnetic field extending axially through said interaction space; means for producing a unidirectional electrical field between said anode structure and said cathode structure; means terminating said coaxial transmission line to provide a resonant cavity for determining the frequency of operation of said oscillator, said unidirectional magnetic field and said unidirectional electrical field and said resonant cavity cooperating to establish an axially extending RF wave in said axially extending space and having associated therewith RF electrical fields and RF magnetic fields normal to the axis of said device and extending into said interaction space; and output connections respectively coupled to said anode structure and said cathode structure for removing RF energy from said axially extending space utilizing said cathode structure as a probe interacting with said RF fields.

9. A microwave oscillator comprising a crossed-field discharge device including an anode structure defining an axially extending space, an axially extending cathode structure disposed in said axially extending space and cooperating with said anode structure of define an axially extending annular interaction space, a first end structure joining corresponding first ones of the adjacent ends of said anode structure and said cathode structure and mechanically supporting said cathode structure with respect to said anode structure while providing electrical insulation therebetween, and a second end structure joining corresponding second ones of the adjacent ends of said anode structure and said cathode structure and mechanically supporting said cathode structure with respect to said anode structure while providing electrical insulation therebetween, said end structures enclosing and sealing both the ends of said anode structure and said axially extending space; means for producing a unidirectional magnetic field extending axially through said interaction space; means for producing a unidirectional electrical field between said anode structure and said cathode structure; a resonant circuit coupled to said device for determining the frequency of operation of said oscillator, said unidirectional magnetic field and said unidirectonal electrical field and said resonant circuit cooperating to establish an axially extending RF wave in said axially extending space and having associated therewith RF electrical fields and RF magnetic fields normal to the axis of said device and extending into said interaction space; and output connections respectively coupled to said anode structure and said cathode structure for removing RF energy from said axially extending space utilizing said cathode structure as a probe interacting with said RF fields.

10. A microwave oscillator comprising a crossed-field discharge device including an anode structure defining an axially extending space, an axially extending cathode structure disposed in said axially extending space and cooperating with said anode structure to define an axially extending annular interaction space, a first connector electrically connected to one terminal of said cathode structure, a second connector electrically connected to the other terminal of said cathode structure, a first end structure joining one end of said anode structure and said first connector for mechanically supporting said cathode structure with respect to said anode structure while providing electrical insulation therebetween, and a second end structure joining the other end of said anode structure and said second connector for mechanically supporting said cathode structure with respect to said anode structure while providing electrical insulation therebetween, said end structures enclosing and sealing both the ends of said anode structure and said axially extending space; means for producing a unidirectional magnetic field extending axially through said interaction space; means for producing a unidirectional electrical field between said anode structure and said cathode structure; a resonant circuit coupled to said device for determining the frequency of operation of said oscillator, said unidirectional magnetic field and said unidirectional electrical field and said resonant circuit cooperating to establish an axially extending RF wave in said axially extending space and having associated therewith RF electrical fields and RF magnetic fields normal to the axis of said device and extending into said interaction space; and output connections respectively coupled to said anode structure and said cathode structure for removing RF energy from said axially extending space utilizing said cathode structure as a probe interacting with said RF fields.

11. A microwave oscillator comprising a crossed-field discharge device including an anode structure defining an axially extending space, an axially extending emissive cathode disposed in said axially extending spaces and cooperating with said anode structure to define an axially extending annular interaction space, a heater for said cathode disposed adjacent thereto, a first connector commonly electrically connected both to said cathode and to one terminal of said heater, a second connector electrically connected to the other terminal of said heater, a first end structure joining one end of said anode structure and said first connector for mechanically supporting said cathode and said heater with respect to said anode structure while providing electrical insulation therebetween, and a second end structure joining the other end of said anode structure and said second connector for mechanically supporting said cathode and said heater with respect to said anode structure while providing electrical insulation therebetween, said end structures enclosing and sealing both the ends of said anode structure and said axially extending space; means for producing a unidirectional magnetic field extending axially through said interaction space; means for producing a unidirectional electrical field between said anode structure and said cathode structure; a resonant circuit coupled to said device for determining the frequency of operation of said oscillator, said unidirectional magnetic field and said unidirectional electrical field and said resonant circuit cooperating to establish an axially extending RF wave in said axially extending space and having associated therewith RF electrical fields and RF magnetic fields normal to the axis of said device and extending into said interaction space; and output connections respectively coupled to said anode structure and said first connector for removing RF energy from said axially extending space utilizing said cathode as a probe interacting with said RF fields.

12. A microwave oscillator comprising a crossed-field discharge device including an anode structure defining an axially extending space, a plurality of axially extending anode segments on said anode structure and projecting radially into said axially extending space and providing a corresponding plurality of axially extending anode recesses therebetween, a plurality of rods respectively disposed in said anode recesses and respectively spaced from the adjacent ones of said anode segments, means electrically interconnecting said rods at corresponding ends thereof, an axially extending cathode structure disposed in said axially extending space and cooperating with said anode structure to define an axially extending annular interaction space, said cathode structure including an electron emissive element disposed within said anode structure and adjacent to the inner portion of said interaction space, means electrically interconnecting said rods and said cathode structure within said axially extending space, and end structures enclosing both the ends of said anode structure and said axially extending space; means for producing a unidirectional magnetic field extending axially through said interaction space; means for producing a unidirectional electrical field between said anode structure and said cathode structure; a resonant circuit coupled between said anode structure and said cathode structure for determining the frequency of operation of said oscillator, said unidirectional magnetic field and said unidirectional electrical field and said resonant circuit cooperating to establish an axially extending RF wave in said axially extending space and having associated therewith RF electrical fields and RF magnetic fields normal to the axis of said device and extending into said interaction space; and output connections respectively coupled to said anode structure and said cathode structure for removing RF energy from said axially extending space utilizing said cathode structure as a probe interacting with said RF fields.

13. A microwave oscillator comprising a crossed-field discharge device including an anode structure defining an axially extending space, a plurality of axially extending anode segments on said anode structure and projecting radially into said axially extending space and providing a corresponding plurality of axially extending anode recesses therebetween, a plurality of rods respectively disposed in said anode recesses and respectively spaced from the adjacent ones of said anode segments, means electrically interconnecting said rods at corresponding ends thereof, an axially extending cathode structure disposed in said axially extending space and cooperating with said anode structure to define an axially extending annular interaction space, said cathode structure including a conically shaped electron emissive element disposed within said anode structure and adjacent to the inner portion of said interaction space with the axis of said element extending axially of said device, means electrically interconnecting said rods and said cathode structure within said axially extending space, and end structures enclosing the both ends of said anode structure and said axially extending space; means for producing a unidirectional magnetic field extending axially through said interaction space; means for producing a unidirectional electrical field between said anode structure and said cathode structure; a resonant circuit coupled between said anode structure and said cathode structure for determining the frequency of operation of said oscillator, said unidirectional magnetic field and said unidirectional electrical field and said resonant circuit cooperating to establish an axially extending RF wave in said axially extending space and having associated therewith RF electrical fields and RF magnetic fields normal to the axis of said device and extending into said interaction space; and output connections respectively coupled to said anode structure and said cathode structure for removing RF energy from said axially extending space utilizing said cathode structure as a probe interacting with said RF fields.

14. A microwave amplifier comprising a crossed-field discharge device including an anode structure defining an axially extending space, an axially extending cathode structure disposed in said axially extending space and cooperating with said anode structure to define an axially extending annular interaction space, and end structures enclosing both the ends of said anode structure and said axially extending space; a microwave input coupled between said anode structure and said cathode structure at one end of said device; means for producing a unidirectional magnetic field extending through said axially extending space; means for producing a unidirectional electrical field between said anode structure and said cathode structure; said magnetic field and said electrical field and said input cooperating to establish an axially extending RF wave in said axially extending space and having associated therewith RF electrical fields and RF magnetic fields normal to the axis of said device and extending into said interaction space; and a microwave output coupled between said anode structure and said cathode structure at the other end of said device for removing RF energy from said axially extending space utilizing said cathode structure as a probe interacting with said RF fields; whereby a microwave signal fed to the input of said amplifier at said one end of said device is amplified thereby and the amplified microwave signal appears at the output of said amplifier at the other end of said device.

15. A microwave amplifier comprising a crossed-field discharge device including an anode structure defining an axially extending space, an axially extending cathode structure disposed in said axially extending space and cooperating with said anode structure to define an axially extending annular interaction space, a first end structure joining corresponding first ones of the adjacent ends of said anode structure and said cathode structure and mechanically supporting said cathode structure with respect to said anode structure while providing electrical insulation therebetween, and a second end structure joining corresponding second ones of the adjacent ends of said anode structure and said cathode structure and mechanically supporting said cathode structure with respect to said anode structure while providing electrical insulation therebetween, said end structures enclosing and sealing both the ends of said anode structure and said axially extending space; a microwave input coupled between said anode structure and said cathode structure at one end of said device; means for producing a unidirectional magnetic field extending through said axially extending space; means for producing a unidirectional electrical field between said anode structure and said cathode structure; said magnetic field and said electrical field and said input cooperating to establish an axially extending RF wave in said axially extending space and having associated therewith RF electrical fields and RF magnetic fields normal to the axis of said device and extending into said interaction space; and a microwave output coupled between said anode structure and said cathode structure at the other end of said device for removing RF energy from said axially extending space utilizing said cathode structure as a probe interacting with said RF fields; whereby a microwave signal fed to the input of said amplifier at said one end of said device is amplified thereby and the amplified microwave signal appears at the output of said amplifier at the other end of said device.

16. A microwave amplifier comprising a crossed-field discharge device including an anode structure defining an axially extending space, an axially extending cathode structure disposed in said axially extending space and cooperating with said anode structure to define an axially extending annular interaction space, a first connector electrically connected to one terminal of said cathode structure, a second connector electrically connected to the other terminal of said cathode structure, a first end structure joining one end of said anode structure and said first connector for mechanically supporting said cathode structure with respect to said anode structure while providing electrical insulation therebetween, and a second end structure joining the other end of said anode structure and said second connector for mechanically supporting said cathode structure with respect to said anode structure while providing electrical insulation therebetween, said end structures enclosing and sealing both the ends of said anode structure and said axially extending space; a microwave input coupled between said anode structure and said first conductor; means for producing a unidirectional magnetic field extending through said axially extending space; means for producing a unidirectional electrical field between said anode structure and said cathode structure; said magnetic field and said electrical field and said input cooperating to establish an axially extending RF wave in said axially extending space and having associated therewith RF electrical fields and RF magnetic fields normal to the axis of said device and extending into said interaction space; and a microwave output coupled between said anode structure and said second connector for removing RF energy from said axially extending space utilizing said cathode structure as a probe interacting with said RF fields; whereby a microwave signal fed to the input of said amplifier is amplified thereby and the amplified microwave signal appears at the output of said amplifier.

17. A microwave amplifier comprising a crossed-field discharge device including an anode structure defining an axially extending space, a plurality of axially extending anode segments on said anode structure and projecting radially into said axially extending space and providing a corresponding plurality of axially extending anode recesses therebetween, a plurality of rods respectively disposed in said anode recesses and respectively spaced from the adjacent ones of said anode segments, means electrically interconnecting said rods at corresponding ends thereof, an axially extending cathode structure disposed in said axially extending space and cooperating with said anode structure to define an axially extending annular interaction space, said cathode structure including an electron emissive element disposed within said anode structure and adjacent to the inner portion of said interaction space, means electrically interconnecting said rods and said cathode structure within said axially extending space, and end structures enclosing both the ends of said anode structure and said axially extending space; a microwave input coupled between said anode structure and said cathode structure at one end of said device; means for producing a unidirectional magnetic field extending through said axially extending space; means for producing a unidirectional electrical field between said anode structure and said cathode structure; said magnetic field and said electrical field and said input cooperating to establish an axially extending RF wave in said axially extending space and having associated therewith RF electrical fields and RF magnetic fields normal to the axis of said device and extending into said interaction space; and a microwave output coupled between said anode structure and said cathode structure at the outer end of said device for removing RF energy from said axially extending space utilizing said cathode structure as a probe interacting with said RF fields; whereby a microwave signal fed to the input of said amplifier at said one end of said device is amplified thereby and the amplified microwave signal appears at the output of said amplifier at the other end of said device.

18. A microwave amplifier comprising a crossed-field discharge device including an anode structure defining an axially extending space, an axially extending cathode structure disposed in said axially extending space and cooperating with said anode structure to define an axially extending annular interaction space, said cathode structure including a conically shaped electron emissive element disposed within said anode structure and adjacent to the inner portion of said interaction space and extending substantially the length thereof with the axis of said element extending axially of said device, and end structures enclosing both the ends of said anode structure and said axially extending space; a microwave input coupled between said anode structure and said cathode structure at the end of said device adjacent to the smaller end of said element; means for producing a unidirectional magnetic field extending through said axially extending space; means for producing a unidirectional electrical field between said anode structure and said cathode structure; said magnetic field and said electrical field and said input cooperating to establish an axially extending RF wave in said axially extending space and having associated therewith RF electrical fields normal to the axis of said device and extending into said interaction space; and a microwave output coupled between said anode structure and said cathode structure at the end of said device adjacent to the larger end of said element for removing RF energy from said axially extending space utilizing said cathode structure as a probe interacting with said RF fields; whereby a microwave signal fed to the input of said amplifier is amplified thereby and the amplified microwave signal appears at the output of said amplifier.

19. A microwave amplifier comprising a crossed-field discharge device including an anode structure defining an axially extending space, an axially extending cathode structure disposed in said axially extending space and cooperating with said anode structure to define an axially extending annular interaction space, said cathode structure including a conically shaped electron emissive element disposed within said anode structure and adjacent to the inner portion of said interaction space and extending substantially the length thereof with the axis of said element extending axially of said device, a first end structure joining corresponding first ones of the adjacent ends of said anode structure and said cathode structure and mechanically supporting said cathode structure with respect to said anode structure while providing electrical insulation therebetween, a second end structure joining corresponding second ones of the adjacent ends of said anode structure and said cathode structure and mechanically supporting said cathode structure with respect to said anode structure while providing electrical insulation therebetween, said end structures enclosing and sealing both the ends of said anode structure and said axially extending space; a microwave input coupled between said anode structure and said cathode structure at the end of said device adjacent to the smaller end of said element; means for producing a unidirectional magnetic field extending through said axially extending space; means for producing a unidirectional electrical field between said anode structure and said cathode structure; said magnetic field and said electrical field and said input cooperating to establish an axially extending RF wave in said axially extending space and having associated therewith RF electrical fields normal to the axis of said device and extending into said interaction space; and a microwave output coupled between said anode structure and said cathode structure at the end of said device adjacent to the larger end of said element for removing RF energy from said axially extending space utilizing said cathode structure as a probe interacting with said RF fields; whereby a microwave signal fed to the input of said amplifier is amplified thereby and the amplified microwave signal appears at the output of said amplifier.

20. A microwave amplifier comprising a crossed-field discharge device including an anode structure defining an axially extending space, a pair of pole pieces respectively arranged adjacent to the opposite ends of said anode structure, a plurality of axially extending anode segments on said anode structure and projecting radially into said axially extending space and providing a corresponding plurality of axially extending anode recesses therebetween, a plurality of rods respectively disposed in said anode recesses and respectively spaced from the adjacent ones of said anode segments, means electrically interconnecting said rods at corresponding ends thereof, an axially extending cathode structure disposed in said axially extending space and cooperating with said anode structure to define an axially extending annular interaction space, said cathode structure including a conically shaped electron emissive element disposed within said anode structure and adjacent to the inner portion of said interaction space with the axis of said element extending axially of said device, means electrically interconnecting said rods and said cathode structure within said axially extending space, and end structures enclosing both the ends of said anode structure and said axially extending space; a microwave input coupled between said anode structure and said cathode structure at the end of said device adjacent to the smaller end of said element; means for producing a unidirectional magnetic field extending through said axially extending space; means for producing a unidirectional electrical field between said anode structure and said cathode structure; said magnetic field and said electrical field and said input cooperating to establish an axially extending RF wave in said axially extending space and having associated therewith RF electrical fields normal to the axis of said device and extending into said interaction space; and a microwave output coupled between said anode structure and said cathode structure at the end of said device adjacent to the larger end of said element for removing RF energy from said axially extending space utilizing said cathode structure as a probe interacting with said RF fields; whereby a microwave signal fed to the input of said amplifier is amplified thereby and the amplified microwave signal appears at the output of said amplifier.

References Cited

UNITED STATES PATENTS

| | | | |
|---|---|---|---|
| 2,592,206 | 4/1952 | Sproull | 315—39.51 X |
| 2,782,342 | 2/1957 | Kilgore | 315—39.53 X |
| 2,819,449 | 1/1958 | Herold | 315—39 X |
| 2,869,012 | 1/1959 | Muller | 313—157 |
| 3,273,011 | 9/1966 | Brown | 315—39 |
| 3,305,751 | 2/1967 | Brown | 315—39.51 |
| 3,312,859 | 4/1967 | Wilbur et al. | 315—39 |

ELI LIEBERMAN, *Primary Examiner.*

HERMAN K. SAALBACH, *Assistant Examiner.*